United States Patent
Dick et al.

(10) Patent No.: US 7,707,975 B2
(45) Date of Patent: *May 4, 2010

(54) RADIAL IMPULSE ENGINE, PUMP, AND COMPRESSOR SYSTEMS, AND ASSOCIATED METHODS OF OPERATION

(75) Inventors: Timber Dick, Denver, CO (US); Corban I. Tillemann-Dick, Denver, CO (US)

(73) Assignee: IRIS Engines, Inc., Washington, DC (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/953,968

(22) Filed: Dec. 11, 2007

(65) Prior Publication Data

US 2008/0087162 A1    Apr. 17, 2008

Related U.S. Application Data

(63) Continuation of application No. 11/414,167, filed on Apr. 28, 2006, now Pat. No. 7,404,381.

(60) Provisional application No. 60/719,631, filed on Sep. 21, 2005, provisional application No. 60/676,017, filed on Apr. 29, 2005.

(51) Int. Cl.
*F02B 25/08* (2006.01)

(52) U.S. Cl. ..................... 123/18 R; 123/232

(58) Field of Classification Search ............... 123/18 R, 123/232, 241, 246
See application file for complete search history.

(56) References Cited

U.S. PATENT DOCUMENTS

| 696,768 | A | 4/1902 | Sleeper |
|---|---|---|---|
| 2,071,528 | A | 2/1937 | Hover |
| 2,507,923 | A | 5/1950 | Morris |

(Continued)

FOREIGN PATENT DOCUMENTS

EP        0680551        8/1997

(Continued)

OTHER PUBLICATIONS

International Search Report and Written Opinion for International Application No. PCT/US2006/016402, 6 pages, mailed Feb. 5, 2007.

(Continued)

*Primary Examiner*—Noah Kamen
(74) *Attorney, Agent, or Firm*—Perkins Coie LLP

(57) ABSTRACT

Radial impulse engine, pump, and compressor systems are disclosed herein. In one embodiment of the invention, a radial impulse engine includes first and second movable V-members operably disposed between first and second end wall portions. The first V-member can have a first wall portion with a first distal edge portion and a second wall portion with a first cylindrical surface. The second V-member can have a third wall portion with a second distal edge portion and a fourth wall portion with a second cylindrical surface. In this embodiment, the first distal edge portion of the first wall portion can be configured to slide across the second cylindrical surface of the fourth wall portion, and the second distal edge portion of the third wall portion can be configured to slide across the first cylindrical surface of the second wall portion, when the first V-member pivots about a first pivot axis and the second V-member pivots about a second pivot axis.

20 Claims, 33 Drawing Sheets

U.S. PATENT DOCUMENTS

| | | | |
|---|---|---|---|
| 2,731,002 A | 1/1956 | Fiala-Fernbrugg | |
| 2,853,982 A | 9/1958 | Bachle et al. | |
| 2,886,018 A | 5/1959 | Cuddon-Fletcher | |
| 2,896,596 A | 7/1959 | Abraham | |
| 2,925,073 A | 2/1960 | Millar | |
| 2,949,899 A | 8/1960 | Jacklin | |
| 3,021,825 A | 2/1962 | Garcia De La Pera | |
| 3,090,366 A | 5/1963 | Nagelmann | |
| 3,130,592 A | 4/1964 | Burrison | |
| 3,135,166 A | 6/1964 | Born | |
| 3,304,923 A | 2/1967 | Parenti | |
| 3,315,653 A | 4/1967 | Chicurel | |
| 3,394,683 A | 7/1968 | Erick | |
| 3,431,788 A | 3/1969 | Du Pre | |
| 3,439,654 A * | 4/1969 | Campbell, Jr. | 123/246 |
| 3,446,192 A | 5/1969 | Woodward | |
| 3,528,396 A | 9/1970 | Cummins | |
| 3,538,893 A | 11/1970 | Tinsley | |
| 3,563,223 A | 2/1971 | Ishida et al. | |
| 3,604,204 A | 9/1971 | Conrad et al. | |
| 3,677,026 A | 7/1972 | Granryd et al. | |
| 3,692,005 A | 9/1972 | Buske | |
| 3,702,057 A | 11/1972 | Rabiger et al. | |
| 3,857,370 A | 12/1974 | Hemenway | |
| 3,866,581 A | 2/1975 | Herbert | |
| 3,868,931 A | 3/1975 | Dutry et al. | |
| 3,871,337 A | 3/1975 | Green et al. | |
| 3,895,620 A | 7/1975 | Foster | |
| 3,961,607 A | 6/1976 | Brems | |
| 3,969,894 A | 7/1976 | Bachmann | |
| 3,987,767 A | 10/1976 | Buske | |
| 4,030,471 A | 6/1977 | Ginkel | |
| 4,086,880 A | 5/1978 | Bates | |
| 4,090,478 A | 5/1978 | Trimble et al. | |
| 4,090,479 A | 5/1978 | Kaye et al. | |
| 4,188,131 A | 2/1980 | Duguet | |
| 4,305,349 A | 12/1981 | Zimmerly | |
| 4,412,476 A | 11/1983 | Benaroya et al. | |
| 4,418,663 A | 12/1983 | Bentley | |
| 4,419,969 A | 12/1983 | Bundrick, Jr. | |
| 4,463,662 A | 8/1984 | Okuyama et al. | |
| 4,475,439 A | 10/1984 | Myers | |
| 4,480,599 A | 11/1984 | Allais et al. | |
| 4,489,686 A | 12/1984 | Yagi et al. | |
| 4,527,516 A | 7/1985 | Foster et al. | |
| 4,553,471 A | 11/1985 | Brademeyer | |
| 4,635,590 A | 1/1987 | Gerace | |
| 4,651,690 A | 3/1987 | Yang | |
| 4,677,950 A | 7/1987 | Buske | |
| 4,678,407 A | 7/1987 | Benaroya et al. | |
| 4,679,538 A | 7/1987 | Foster et al. | |
| 4,796,514 A | 1/1989 | Richter et al. | |
| 4,800,858 A | 1/1989 | Yang | |
| 4,802,449 A | 2/1989 | Yang | |
| 4,823,745 A | 4/1989 | Yang | |
| 4,867,121 A | 9/1989 | Bivona et al. | |
| 4,905,574 A | 3/1990 | Trevisan et al. | |
| 4,955,328 A | 9/1990 | Sobotowski | |
| 5,004,409 A | 4/1991 | Nakhmanson et al. | |
| 5,012,769 A | 5/1991 | Cottingham | |
| 5,025,756 A | 6/1991 | Nyc | |
| 5,056,471 A | 10/1991 | Van Husen | |
| 5,067,323 A | 11/1991 | Bennett et al. | |
| 5,072,651 A | 12/1991 | Kagita et al. | |
| 5,083,530 A | 1/1992 | Rassey | |
| 5,109,810 A | 5/1992 | Christenson | |
| 5,203,287 A | 4/1993 | Wiley | |
| 5,228,415 A | 7/1993 | Williams | |
| 5,251,594 A | 10/1993 | Meyer | |
| 5,261,358 A | 11/1993 | Rorke et al. | |
| 5,305,716 A | 4/1994 | Huttlin | |
| 5,363,813 A | 11/1994 | Paarlberg | |
| 5,419,292 A | 5/1995 | Antonov | |
| 5,447,142 A | 9/1995 | Bailey | |
| 5,448,979 A | 9/1995 | Clarke | |
| 5,460,128 A | 10/1995 | Kruse | |
| 5,474,044 A | 12/1995 | Matterazzo et al. | |
| 5,477,818 A | 12/1995 | Ascari et al. | |
| 5,517,953 A | 5/1996 | Wiesen | |
| 5,520,147 A | 5/1996 | Secord et al. | |
| 5,636,610 A | 6/1997 | Friedrich et al. | |
| 5,713,314 A | 2/1998 | Beare et al. | |
| 5,809,864 A | 9/1998 | Ashton et al. | |
| 5,950,427 A | 9/1999 | Demerjian, Jr. et al. | |
| 6,016,737 A | 1/2000 | Leijonberg et al. | |
| 6,026,768 A | 2/2000 | Spitler et al. | |
| 6,050,153 A | 4/2000 | Yoneyama et al. | |
| 6,079,377 A | 6/2000 | Leijonberg et al. | |
| 6,082,313 A | 7/2000 | Leijonberg et al. | |
| 6,092,493 A | 7/2000 | Leijonberg et al. | |
| 6,142,112 A | 11/2000 | Leijonberg et al. | |
| 6,148,776 A | 11/2000 | Liejonberg et al. | |
| 6,192,858 B1 | 2/2001 | Nieberding et al. | |
| 6,250,263 B1 | 6/2001 | Sisco | |
| 6,270,322 B1 | 8/2001 | Hoyt | |
| 6,289,867 B1 | 9/2001 | Free | |
| 6,386,838 B2 | 5/2002 | Hoyt | |
| 6,393,841 B1 | 5/2002 | Van Husen | |
| 6,415,747 B1 | 7/2002 | Asano et al. | |
| 6,474,288 B1 | 11/2002 | Blom | |
| 6,722,322 B2 | 4/2004 | Tse et al. | |
| 6,782,800 B2 | 8/2004 | Strain et al. | |
| 6,796,285 B2 | 9/2004 | Karnes | |
| 6,814,045 B2 | 11/2004 | Masters et al. | |
| 6,886,528 B2 | 5/2005 | James | |
| 6,899,017 B2 | 5/2005 | Meagher et al. | |
| 6,912,988 B2 | 7/2005 | Adams et al. | |
| 6,988,482 B2 | 1/2006 | Lockett | |
| 2003/0101962 A1 | 6/2003 | Masters | |
| 2003/0136356 A1 | 7/2003 | Namkung | |
| 2006/0260563 A1 | 11/2006 | Dick et al. | |
| 2006/0260564 A1 | 11/2006 | Dick et al. | |
| 2006/0260565 A1 | 11/2006 | Dick et al. | |
| 2006/0260566 A1 | 11/2006 | Dick et al. | |

FOREIGN PATENT DOCUMENTS

| | | |
|---|---|---|
| FR | 2396585 A1 | 2/1979 |
| RU | 2076217 C1 | 3/1997 |
| RU | 2102612 C1 | 1/1998 |
| RU | 2120043 C1 | 10/1998 |
| RU | 2158830 C1 | 11/2000 |
| SU | 1454989 A1 | 1/1989 |
| WO | WO-03089765 A1 | 10/2003 |

OTHER PUBLICATIONS

Office Action for U.S. Appl. No. 11/413,599, mailed Jul. 31, 2007, 11 pages.
Office Action for U.S. Appl. No. 11/413,606, mailed Jul. 31, 2007, 11 pages.
Office Action for U.S. Appl. No. 11/414,167, mailed Jul. 31, 2007, 11 pages.
Office Action for U.S. Appl. No. 11/414,148, mailed Jul. 31, 2007, 12 pages.
Office Action for U.S. Appl. No. 11/954,572, mailed Feb. 6, 2009.
Office Action for U.S. Appl. No. 11/954,541, mailed Feb. 6, 2009.
Office Action for U.S. App. No. 11/954,053 mailed Jun. 26, 2009.
Office Action (translation) for China Application No. 200680021930.9 dated Jun. 12, 2009.
Office Action for U.S. Appl. No. 11/954,572, mailed Jul. 23, 2009.
Office Action (translation) issued in Aug. 14, 2009 China Application No. 200680021923.9.

* cited by examiner

RADIAL IMPULSE ENGINE, PUMP, AND COMPRESSOR SYSTEMS, AND ASSOCIATED METHODS OF OPERATION

CROSS-REFERENCE TO RELATED APPLICATIONS INCORPORATED BY REFERENCE

This application is a continuation of U.S. patent application Ser. No. 11/414,167, filed Apr. 28, 2006 now U.S. Pat. No. 7,404,381, which claims priority to U.S. Provisional Patent Application No. 60/676,017, filed Apr. 29, 2005, and U.S. Provisional Patent Application No. 60/719,631, filed Sep. 21, 2005. U.S. patent application Ser. No. 11/414,167, U.S. Provisional Patent Application No. 60/676,017, and U.S. Provisional Patent Application No. 60/719,631 are incorporated herein in their entireties by reference.

The present application is related to U.S. patent application Ser. No. 11/414,148, entitled "RADIAL IMPULSE ENGINE, PUMP, AND COMPRESSOR SYSTEMS, AND ASSOCIATED METHODS OF OPERATION," filed Apr. 28, 2006; U.S. patent application Ser. No. 11/413,599, entitled "RADIAL IMPULSE ENGINE, PUMP, AND COMPRESSOR SYSTEMS, AND ASSOCIATED METHODS OF OPERATION," filed Apr. 28, 2006; and U.S. patent application Ser. No. 11/413,606, entitled "RADIAL IMPULSE ENGINE, PUMP, AND COMPRESSOR SYSTEMS, AND ASSOCIATED METHODS OF OPERATION," filed Apr. 28, 2006. Each of the U.S. Patent Applications listed above is incorporated herein in its entirety by reference.

TECHNICAL FIELD

The following disclosure relates generally to engines, pumps, and similar apparatuses and, more particularly, to internal combustion engines.

BACKGROUND

The efficiency of internal combustion engines is often expressed in terms of thermal efficiency, which is a measure of an engine's ability to convert fuel energy into mechanical power. Conventional internal combustion engines with reciprocating pistons typically have relatively low thermal efficiencies. Conventional automobile engines, for example, typically have thermal efficiencies of about 0.25, which means that about seventy-five percent of the fuel's energy is wasted during engine operation. More specifically, about forty percent of the fuel's energy flows out the exhaust pipe as lost heat, while another thirty-five percent is absorbed by the cooling system (i.e., coolant, oil, and surrounding air flow). As a result of these losses, only about twenty-five percent of the fuel's energy is converted into usable power for moving the car and operating secondary systems (e.g., charging systems, cooling systems, power-steering systems, etc.).

There are a number of reasons that conventional internal combustion engines are so inefficient. One reason is that the cylinder head and walls of the combustion chamber absorb heat energy from the ignited fuel but do no work. Another reason is that the ignited fuel charge is only partially expanded before being pumped out of the combustion chamber at a relatively high temperature and pressure during the exhaust stroke. An additional reason is that reciprocating piston engines produce very little torque through much of the piston stroke because of the geometric relationship between the reciprocating piston and the rotating crankshaft.

While some advancements have been made in the field of piston engine technology, it appears that the practical limits of piston engine efficiency have been reached. The average fuel economy of new cars, for example, has increased by only 2.3 miles-per-gallon (mpg) in the last 20 years or so. More specifically, the average fuel economy of new cars has increased from 26.6 mpg in 1982 to only 28.9 mpg in 2002.

Although a number of alternatives to the conventional internal combustion engine have been proposed, each offers only marginal improvements. Hybrid vehicles, for example (e.g., the Toyota Prius), and alternative fuel systems (e.g., propane, natural gas, and biofuels) still use conventional reciprocating piston engines with all of their attendant shortcomings. Electric cars, on the other hand, have limited range and are slow to recharge. Hydrogen fuel cells are another alternative, but implementation of this nascent technology is relatively expensive and requires a new fuel distribution infrastructure to replace the existing petroleum-based infrastructure. Accordingly, while each of these technologies may hold promise for the future, they appear to be years away from mass-market acceptance.

SUMMARY

This summary is provided for the benefit of the reader only, and does not limit the invention as set forth by the claims.

The present invention is directed generally toward engines, pumps, and similar energy conversion devices that convert thermal energy into mechanical energy or, alternatively, convert mechanical energy into fluid energy. An internal combustion engine configured in accordance with one aspect of the invention includes a first end wall portion spaced apart from a second end wall portion to at least partially define a pressure chamber therebetween. The engine further includes first and second movable V-members operably disposed between the first and second end wall portions. The first V-member is configured to pivot about a first pivot axis and includes a first wall portion positioned adjacent to a second wall portion. The first wall portion has a first distal edge portion and the second wall portion has a first cylindrical surface. The second movable V-member is configured to pivot about a second pivot axis and has a third wall portion positioned adjacent to a fourth wall portion. The third wall portion has a second distal edge portion and the fourth wall portion has a second cylindrical surface. In operation, the first distal edge portion of the first wall portion slides across the second cylindrical surface of the fourth wall portion, and the second distal edge portion of the third wall portion slides across the first cylindrical surface of the second wall portion, as the first V-member pivots about the first pivot axis and the second V-member pivots about the second pivot axis.

DETAILED DESCRIPTION

The following disclosure provides detailed descriptions of a number of different engine, pump, and compressor systems, as well as a number of different methods for operating such systems. Certain details are set forth in the following description to provide a thorough understanding of various embodiments of the invention. Other details describing well-known structures and systems often associated with internal combustion engines, steam engines, pumps, compressors, and similar devices are not set forth below, however, to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and/or features without departing from the spirit or scope of the present invention. Furthermore, additional embodiments of the invention can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 140 is first introduced and discussed with reference to FIG. 1.

I. Embodiments of Radial Impulse Internal Combustion Engines

Figure 1:
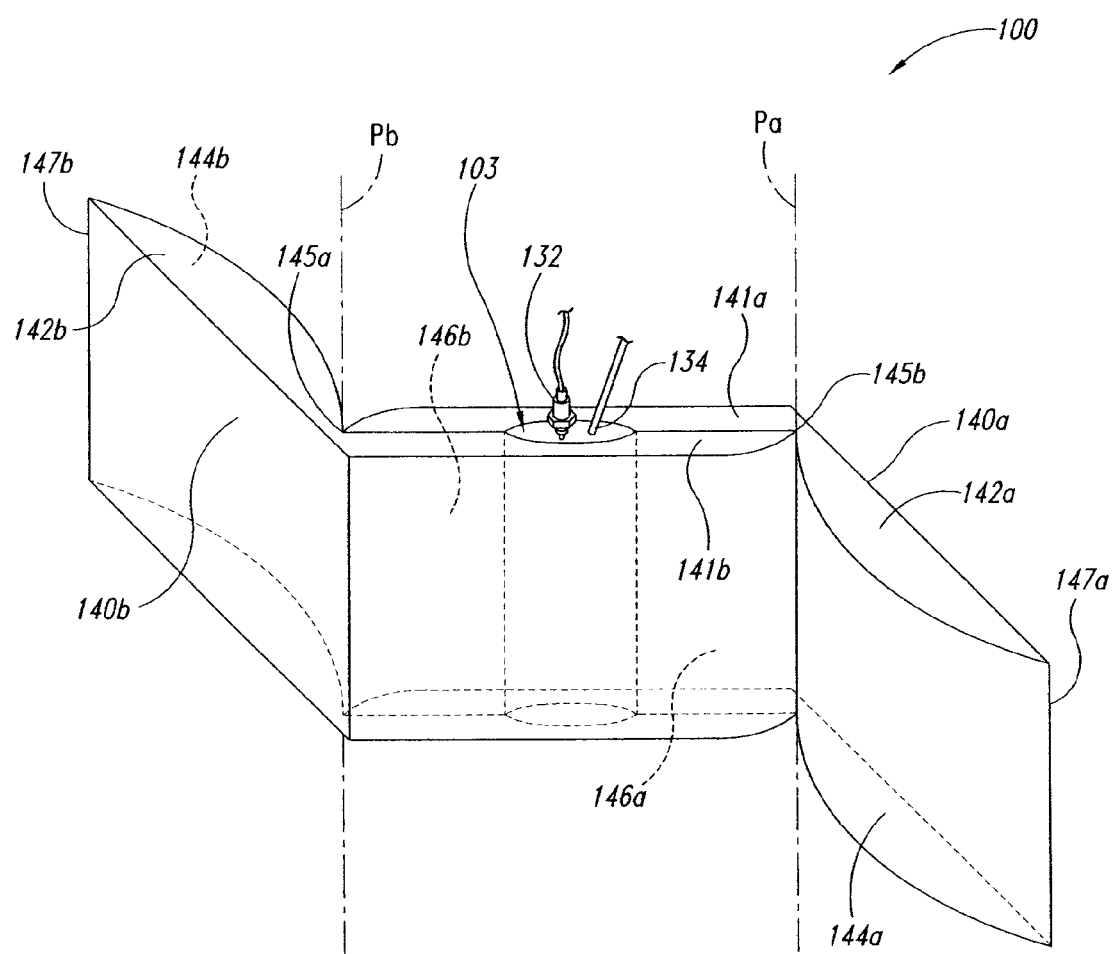
FIG. 1 is a schematic isometric view of a portion of a radial impulse engine configured in accordance with an embodiment of the invention

FIG. 1 is a schematic isometric view of a portion of a radial impulse engine 100 ("engine 100") configured in accordance with an embodiment of the invention. A number of components of the engine 100 are not shown in FIG. 1 for purposes of clarity. In one aspect of this embodiment, the engine 100 includes a plurality of movable members 140 (identified individually as a first movable member 140a and a second movable member 140b) configured to pivot about corresponding pivot axes P (identified individually as a first pivot axis Pa and a second pivot axis Pb). For ease of reference, the movable members 140 are referred to herein as "V-chordons 140." Although the movable members 140 have "V" shapes, other embodiments of the present invention can include other movable members having other shapes, such as "L" shapes, "Y" shapes, "C" shapes, etc. Accordingly, aspects of the present invention are not limited to movable members having a particular shape.

In the illustrated embodiment, the first V-chordon 140a is identical (or at least generally similar) to the second V-chordon 140b. Each of the V-chordons 140 includes a compression wall portion 141 (identified individually as compression wall portions 141a and 141b) and a swept wall portion 142 (identified individually as swept wall portions 142a and 142b). Each of the compression wall portions 141 includes a pressure surface 146 (identified individually as pressure surfaces 146a and 146b) extending at least partially between a first distal edge portion 145 (identified individually as first distal edge portions 145a and 145b) and the corresponding pivot axis P. Each of the swept wall portions 142 includes a cylindrical swept surface 144 (identified individually as swept surfaces 144a and 144b) extending at least partially from a second distal edge portion 147 (identified individually as second distal edge portions 147a and 147b) toward the adjacent pressure surface 146.

The engine 100 further includes at least one fuel injector 134 and at least one igniter 132 positioned proximate to a combustion chamber 103. In the illustrated embodiment, the combustion chamber 103 is at least partially formed by opposing recesses in the compression wall portions 141. In other embodiments, however, the combustion chamber 103, the fuel injector 134, and/or the igniter 132 can have other locations and/or other configurations that differ from those illustrated in FIG. 1. For example, in other embodiments, the fuel injector 134 can be replaced and/or augmented by a carburetor providing fuel/air mixture via an associated inlet.

As mentioned above, many features of the engine 100 have been omitted from FIG. 1 for purposes of clarity. These components can include, for example, various components associated with power take-out, air intake, exhaust, ignition timing, and V-chordon synchronization. These and other features of the engine 100 are described in greater detail below with reference to FIGS. 2A-2D.

Figure 2A:
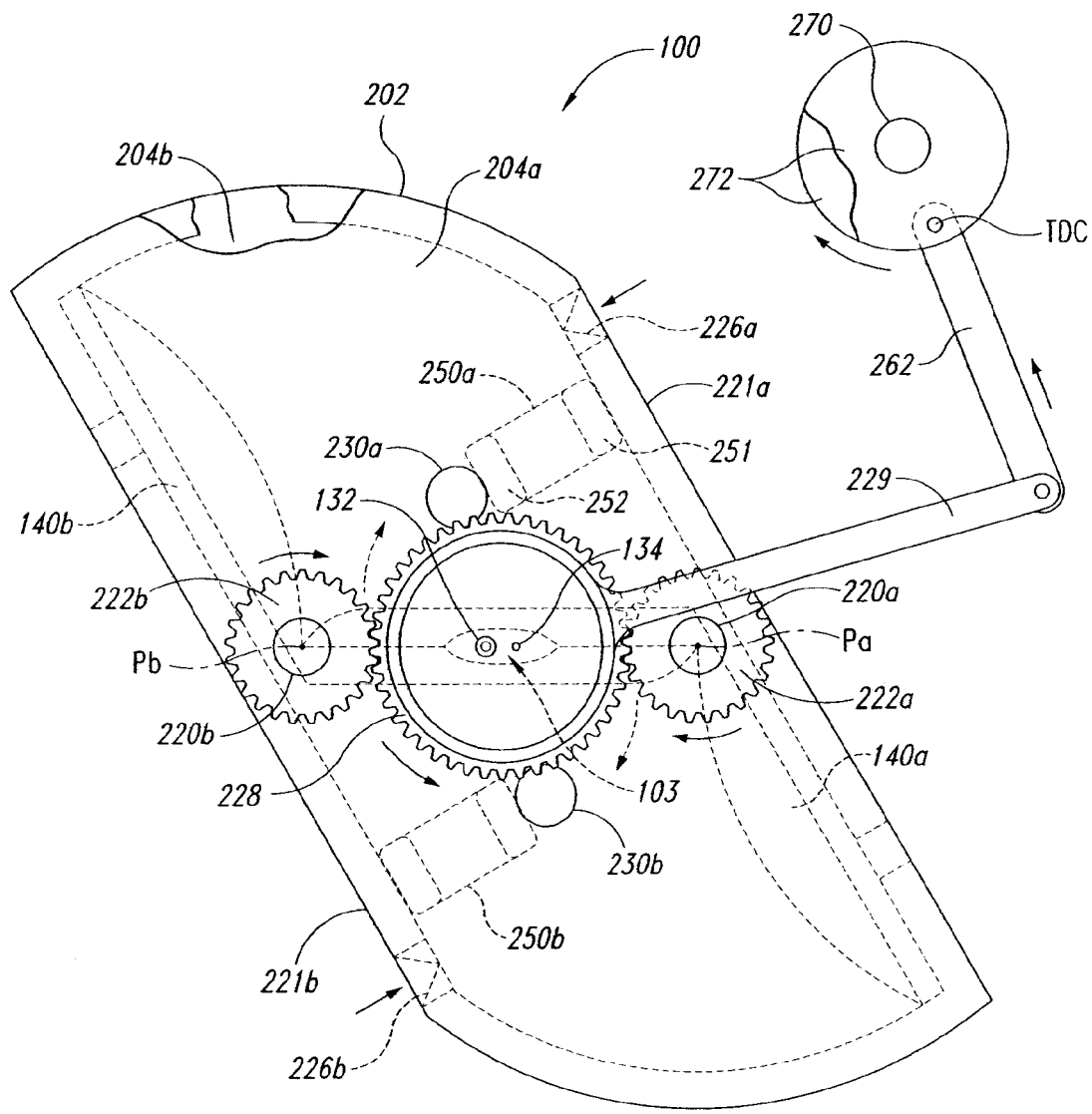
FIGS. 2A-2E are a series of top views illustrating a method of operating the engine of FIG. 1 in a two-stroke mode in accordance with an embodiment of the invention.

FIGS. 2A-2E are a series of top views illustrating a method of operating the engine 100 in a two-stroke mode in accordance with an embodiment of the invention. These Figures illustrate a number of engine components that were omitted from FIG. 1 for purposes of clarity. For example, FIG. 2A illustrates that the V-chordons 140 are pivotally disposed between a first end plate 204a and a second end plate 204b. A scavenging barrel 202 extends between the first end plate 204a and the second plate 204b, and includes a first sidewall portion 221a and an opposing second side wall portion 221b. Each of the sidewall portions 221 includes at least one one-way valve 226 (identified individually as one-way valves 226a and 226b) configured to admit air into the scavenging barrel 202 during engine operation.

The first end plate 204a includes a first exhaust port 230a and a second exhaust port 230b. As described in greater detail below, the exhaust ports 230 are configured to direct exhaust gasses out of the combustion chamber 103 during engine operation. The second end plate 204b includes a first scavenging chamber 250a and a second scavenging chamber 250b. Each scavenging chamber 250 includes an inlet 251 and a corresponding outlet 252. As described in greater detail below, the scavenging chambers 250 enable pressurized air from behind each of the compression wall portions 141 to flow into the combustion chamber 103 during engine operation.

Each of the V-chordons 140 is fixedly attached to a corresponding wrist shaft 220 (identified individually as a first wrist shaft 220a and a second wrist shaft 220b) which pivots about the corresponding pivot axis P. In the illustrated embodiment, each of the wrist shafts 220 extends through the first end plate 204a and is operably coupled to a corresponding timing gear 222 (identified individually as a first timing gear 222a and a second timing gear 222b). Each of the timing gears 222 is operably engaged with a ring gear 228 which is configured to rotate back and forth about its central axis. A crank-arm 229 extends outwardly from the ring gear 228 and is pivotably coupled to a connecting rod 262. The connecting rod 262 is in turn pivotally coupled to a crankshaft 270. The crankshaft 270 can include one or more flywheels 272 of sufficient mass to drive the V-chordons 140 through a compression (i.e., inward) portion of their cycle as described in greater detail below.

The closed chordon position illustrated in FIG. 2A can be referred to as "top dead center" (i.e., "TDC") for ease of reference. The TDC position of the V-chordons 140 corresponds to the TDC position of the crankshaft 270. At this point in the cycle, the fuel injector 134 has injected fuel into the combustion chamber 103, and the igniter 132 has ignited the compressed fuel/air mixture. The resulting combustion drives the compression wall portions 141 outwardly, causing the wrist shafts 220 to rotate in a clockwise direction about their respective pivot axes P. As the wrist shafts 220 rotate, the timing gears 222 drive the ring gear 228 in a counterclockwise direction. As the ring gear 228 rotates, it transmits power from the V-chordons 140 to the crankshaft 270 via the crank-arm 229.

Figure 2B:
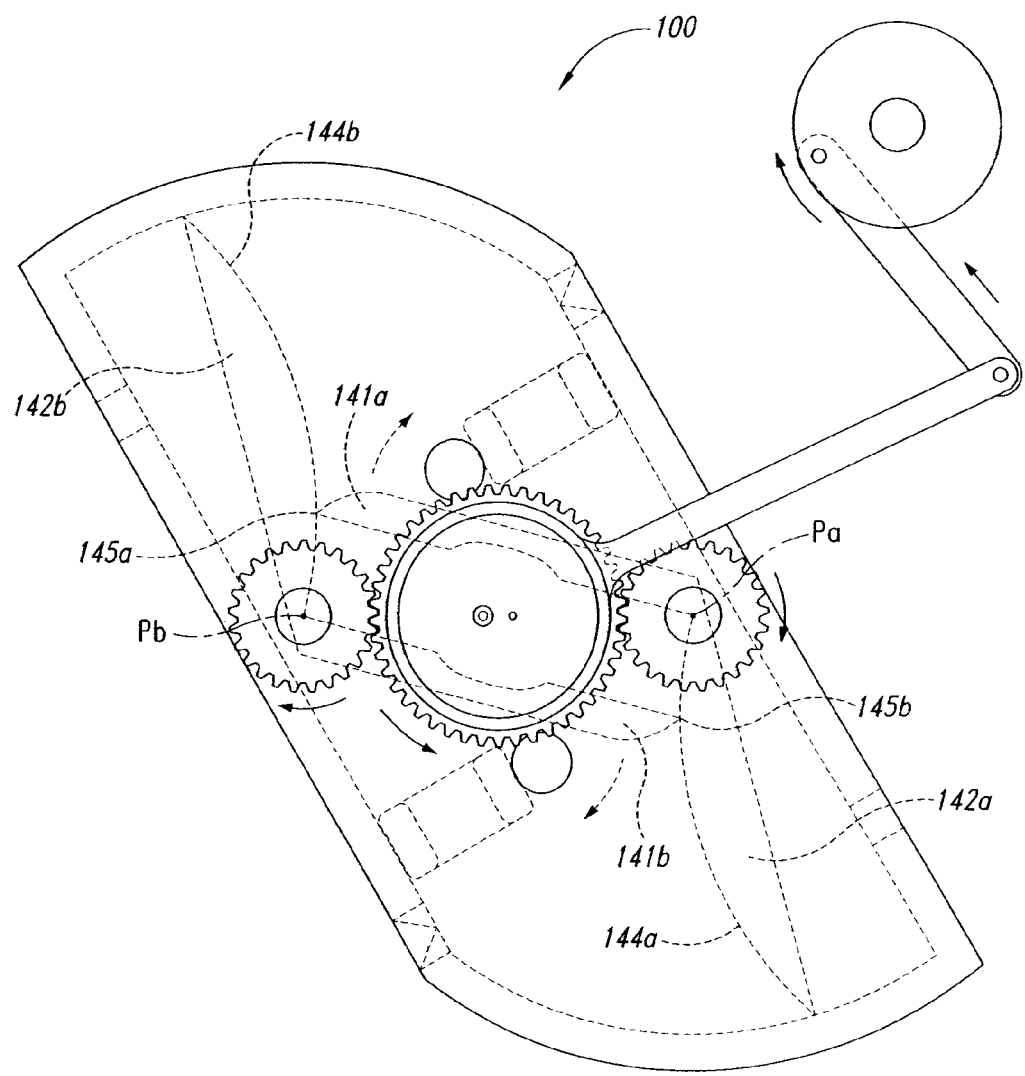

Referring next to FIG. 2B, as the V-chordons 140 continue rotating in the clockwise direction, the first distal edge portion 145 of each compression wall portion 141 slides across the adjacent swept surface 144 of the opposing swept wall portion 142, thereby maintaining a satisfactory seal of the combustion chamber 103. Although not shown in FIGS. 1-2E, each of the distal edge portions 145 (and/or other portions of the V-chordons 140) can include a metallic seal or other device to enhance sealing between adjacent surfaces. Such devices are described in detail in U.S. Provisional Patent Application No. 60/676,017, which is incorporated into the present disclosure in its entirety by reference.

Figure 2C:
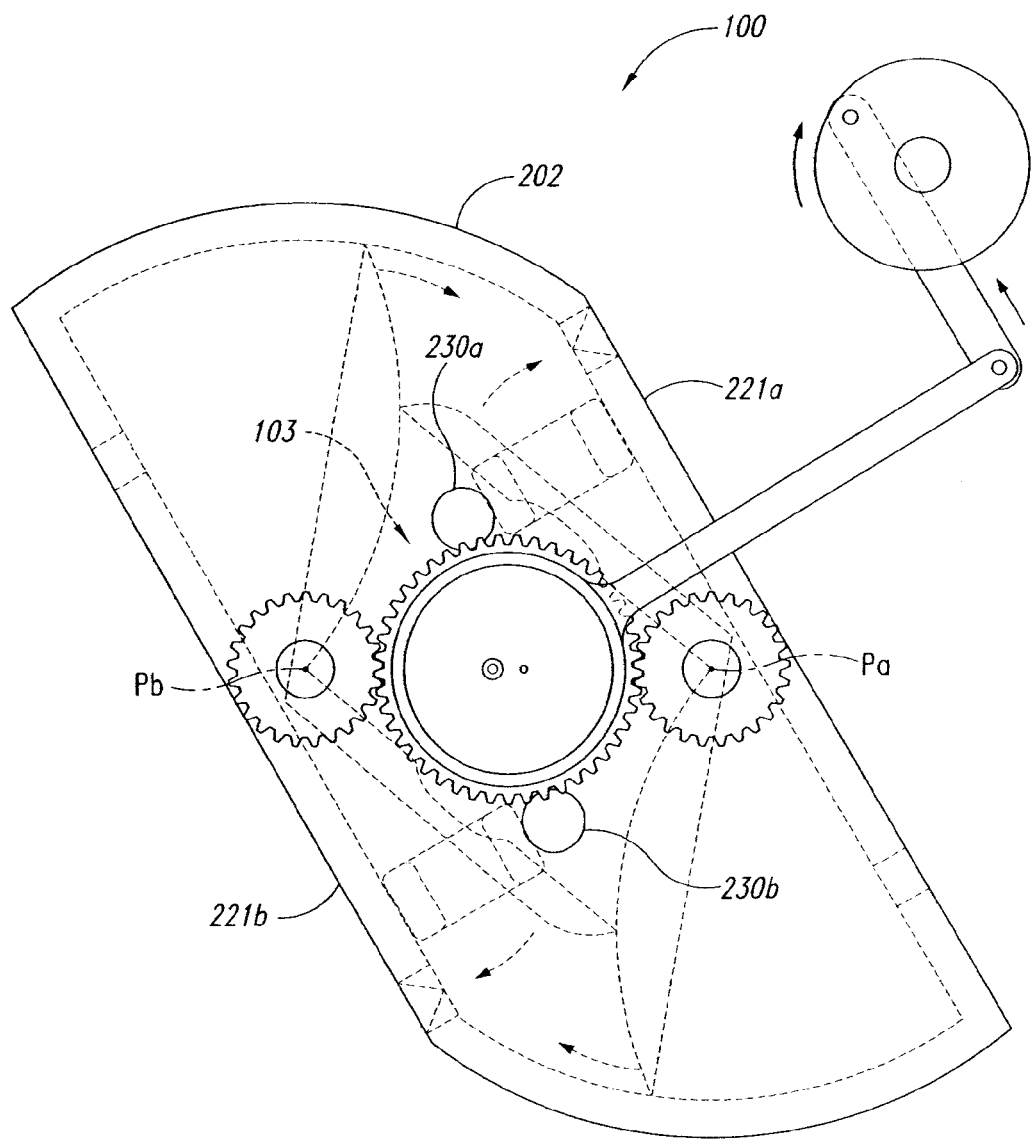

As the compression wall portions 141 approach the position shown in FIG. 2C, the expanding exhaust gasses begin to flow out of the combustion chamber 103 through the exposed exhaust ports 230. As the compression wall portions 141 continue moving outwardly, they compress the intake charges trapped between them and the adjacent sidewall portions 221. As the compression wall portions 141 approach the position shown in FIG. 2D, they drive these compressed air charges into the combustion chamber 103 via the scavenging chambers 250. The incoming air helps drive the exhaust gasses out of the combustion chamber 103 through the exhaust ports 230.

Figure 2D:
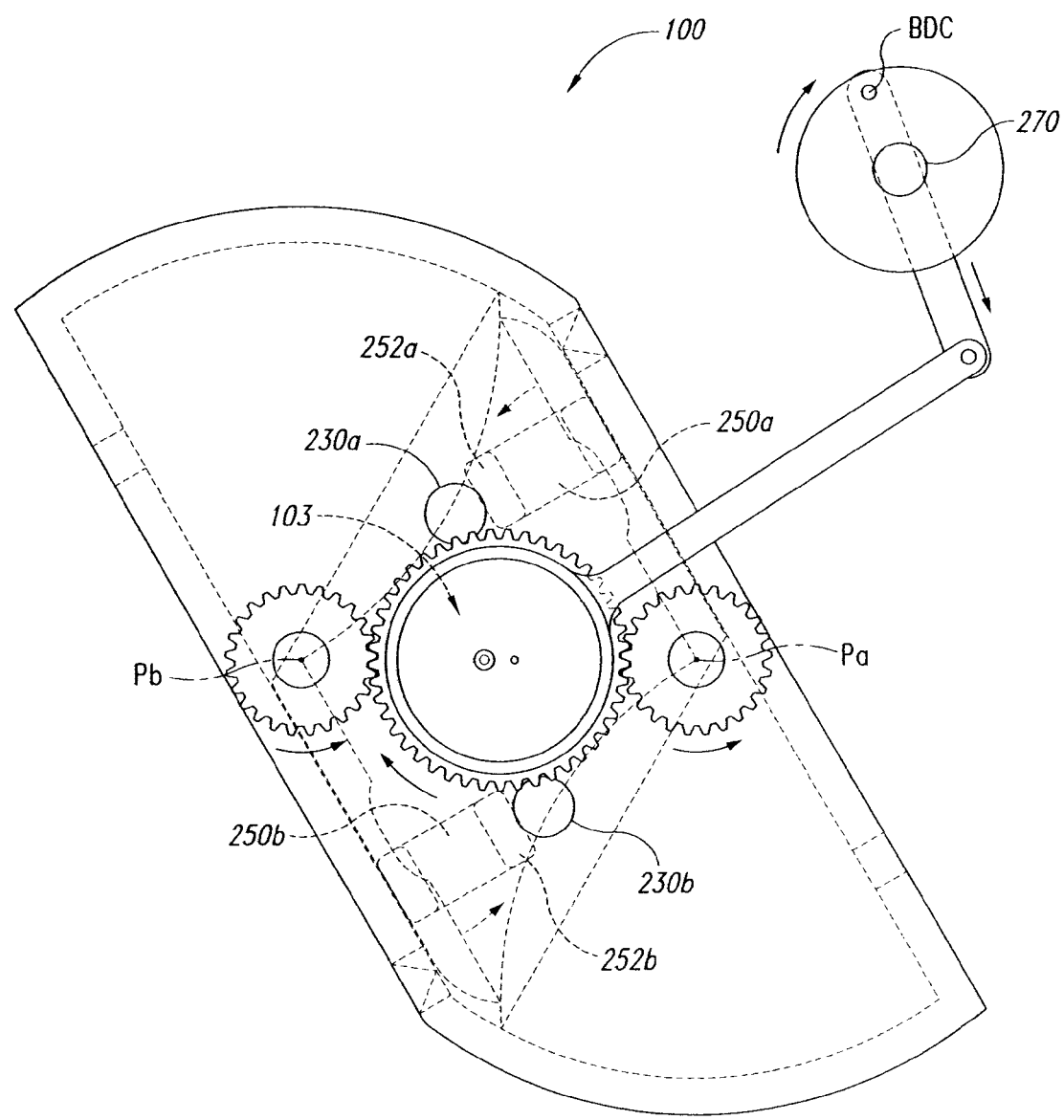

When the V-chordons 140 reach the position shown in FIG. 2D (i.e., the "bottom dead center" or "BDC" position), the kinetic energy of the crankshaft 270 causes the V-chordons 140 to reverse direction and begin rotating toward the TDC position of FIG. 2A. As the compression walls portions 141 rotate in the counterclockwise direction, they drive the remaining exhaust gasses out of the combustion chamber 103 through the exhaust ports 230. In addition, this inward movement of the compression wall portions 141 draws air into the scavenging barrel 202 through the one-way valves 226.

Figure 2E:
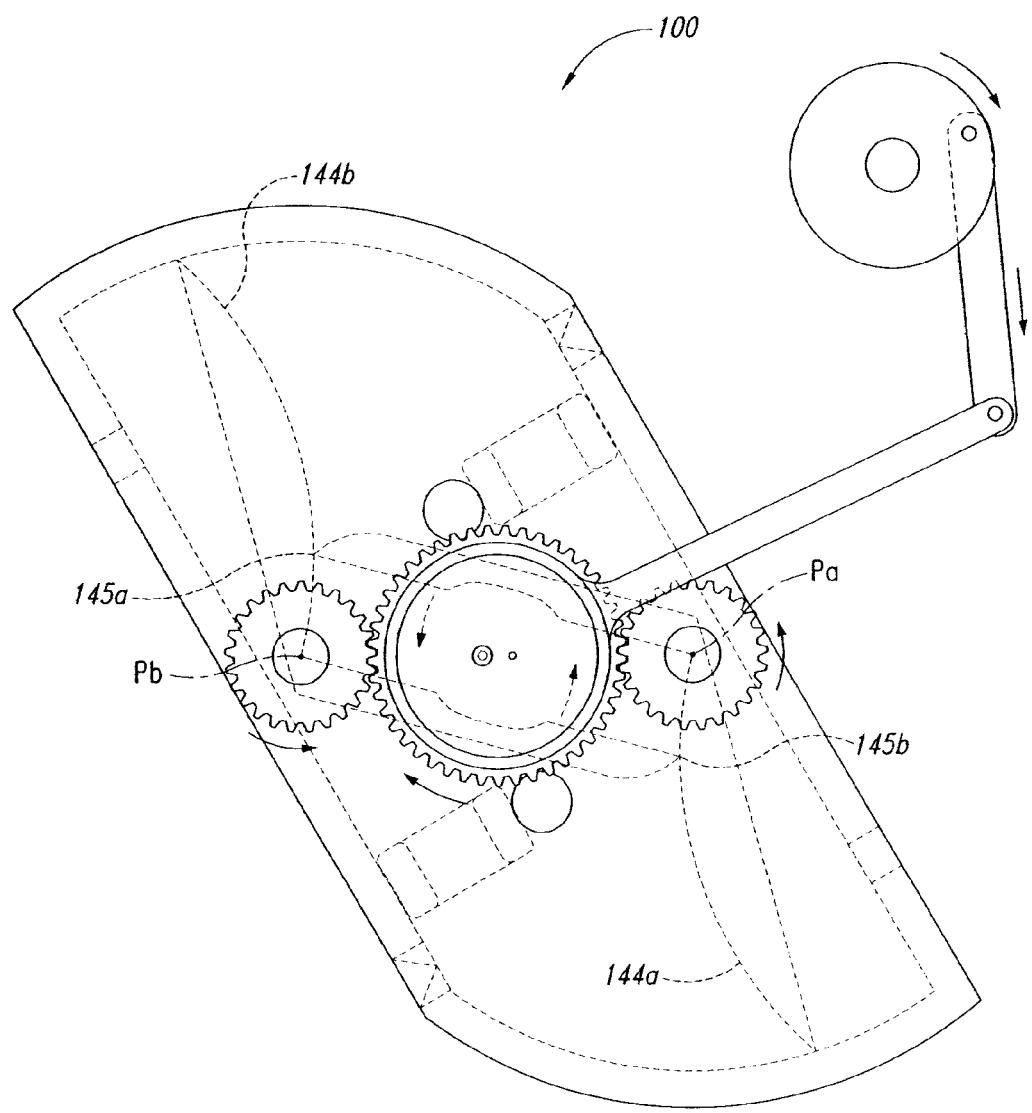

Referring next to FIG. 2E, the compression wall portions 141 compress the air in the combustion chamber 103 as they continue moving inwardly past the exhaust ports 230. When the V-chordons 140 are at or near the TDC position of FIG. 2A, the fuel injector 134 sprays fuel into the combustion chamber 103 and the igniter 132 ignites the compressed fuel/air mixture. The resulting combustion drives the V-chordons 140 outwardly in the clockwise direction and the cycle described above repeats.

Although the engine 100 described above includes transfer chambers and exhaust ports for moving the charge into and out of the combustion chamber 103, in other embodiments, similar engines configured in accordance with aspects of the present invention can include poppet valves for performing these functions. For example, in one embodiment, an engine similar to the engine 100 can include centrally-located poppet valves on each of the end plates 204 for expelling exhaust gases from the combustion chamber 103. Such an arrangement would allow for dual scavenging chambers, one on the first end plate 204a and another on the second end plate 204b, for admitting intake charge into the combustion chamber 103. In a further embodiment, an engine similar to the engine 100 can be configured to operate as a four-stroke engine using poppet valves. Accordingly, aspects of the embodiment illustrated in FIGS. 1-2E are not limited to the particular two-stroke features described above, but extend to other embodiments that may include other two- and four-stroke features.

II. Selected Chordon Features

Figure 3:
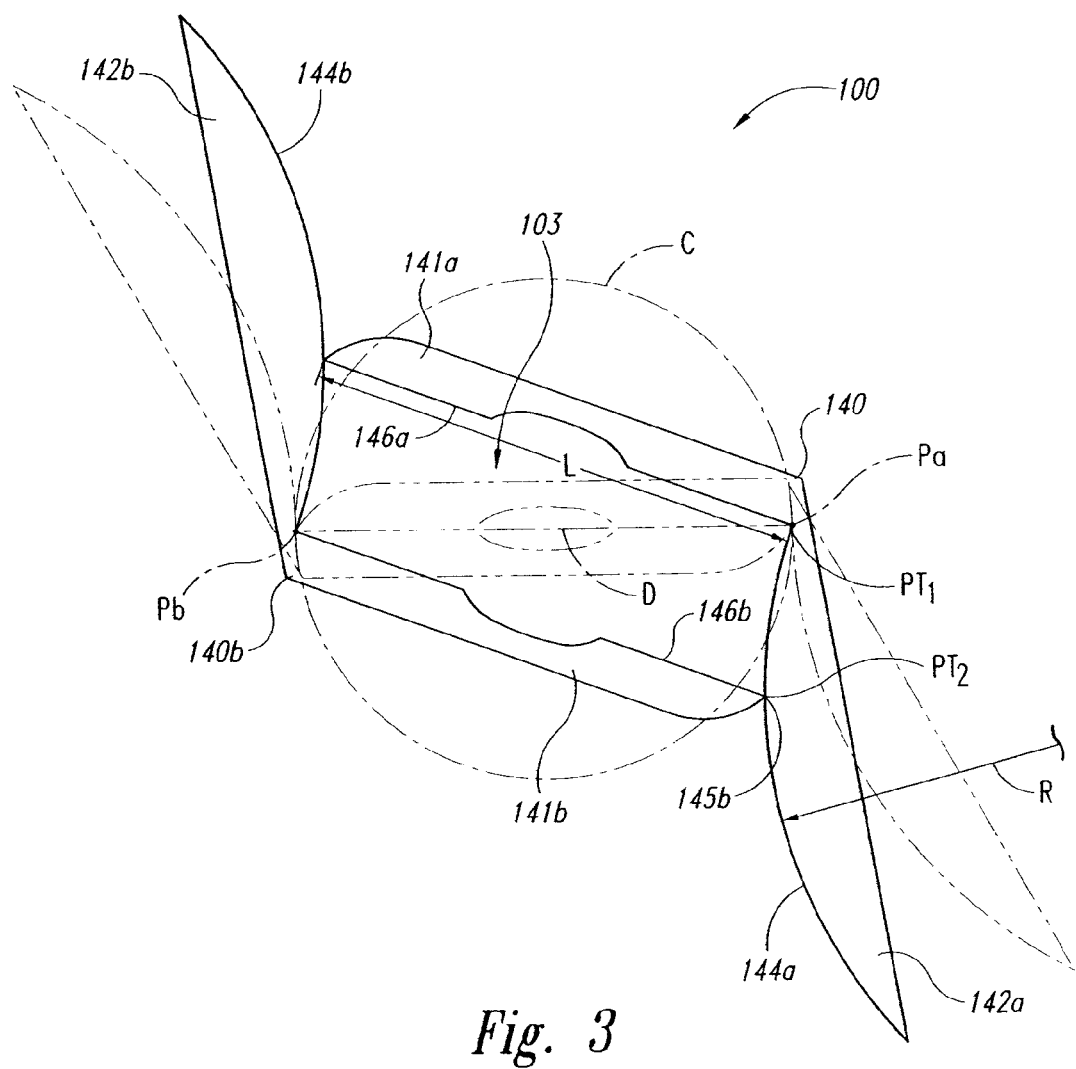
FIG. 3 is a schematic top view illustrating various geometrical features of the engine of FIG. 1.

FIG. 3 is a schematic top view of a portion of the engine 100 for the purpose of illustrating some of the geometrical features of the V-chordons 140. For example, FIG. 3 illustrates that the pivot axes P are equally spaced about a circle C. The circle C has a diameter D, which is equal to a radius of curvature R of the swept surfaces 144.

For a given V-chordon 140, one method for positioning the swept surface 144 relative to the pressure surface 146 is as follows: First (referring to the first V-chordon 140a for ease of reference), a desired length L of the pressure surface 146a is selected. Next, a desired location of the pressure surface 146a at TDC (shown by the phantom lines in FIG. 3) is selected. For example, if the length L of the pressure surface 146a is less than the diameter D of the circle C, then the length L can be centered between the two pivot axes P at TDC. If the length L of the compression wall surface 146a is greater than the diameter D of the circle C, then the length L does not have to be centered relative to the two pivot axes P at TDC. (Such embodiments, however, may result in V-chordons that are not identical to each other.) Selecting the length and location of the pressure surface 146a in the forgoing manner dictates a first point $PT_1$ where the swept surface 144a intersects the pressure surface 146a.

Next, both compression wall portions 141 are rotated outwardly from the TDC position to a partially open position, such as the partially open position shown by the solid line in FIG. 3. The first swept wall portion 142a is then rotated about point $PT_1$ until the distal edge portion 145b of the second compression wall portion 141b just contacts the swept surface 144a. This establishes a second point $PT_2$ where the distal edge portion 145b contacts the swept surface 144a.

Together, the two points PT₁ and PT₂, positively locate the swept surface 144a relative to the pressure surface 146a.

As the discussion above with reference to FIG. 3 illustrates, the cylindrical swept surfaces 144 of the V-chordons 140 do not have to intersect the corresponding pivot axes P for the engine 100 to function properly. That is, the swept surfaces 144 can be positioned inboard or outboard of the corresponding pivot axes P and the V-chordons 140 will still open and close smoothly, maintaining chordon-to-chordon sliding contact for sufficient sealing of the combustion chamber 103.

Figure 4A:
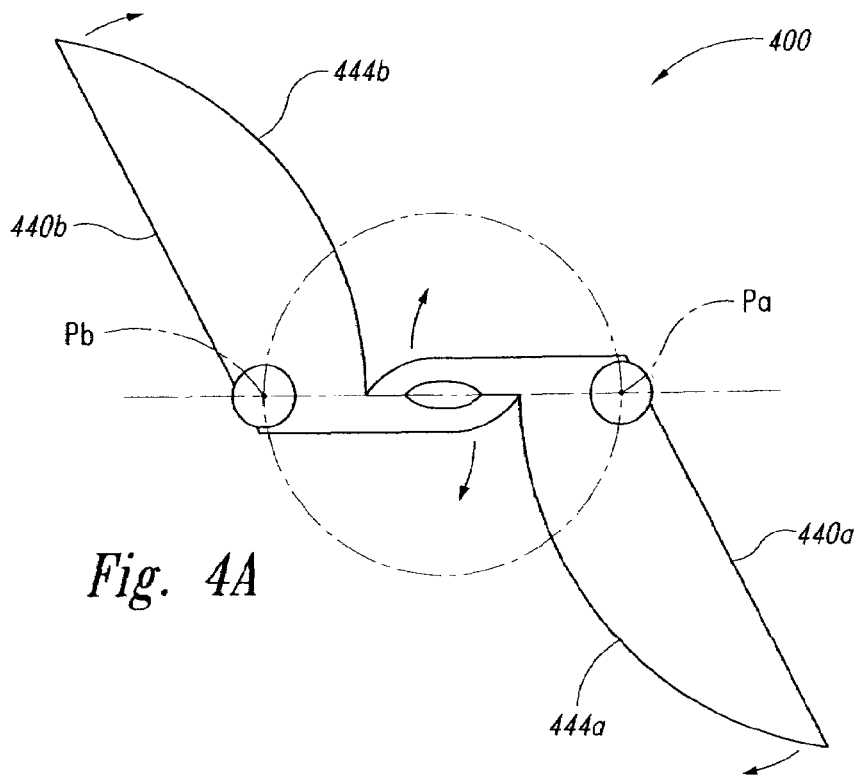
FIGS. 4A and 4B are schematic top views of a radial impulse engine configured in accordance with another embodiment of the invention.
Figure 4B:
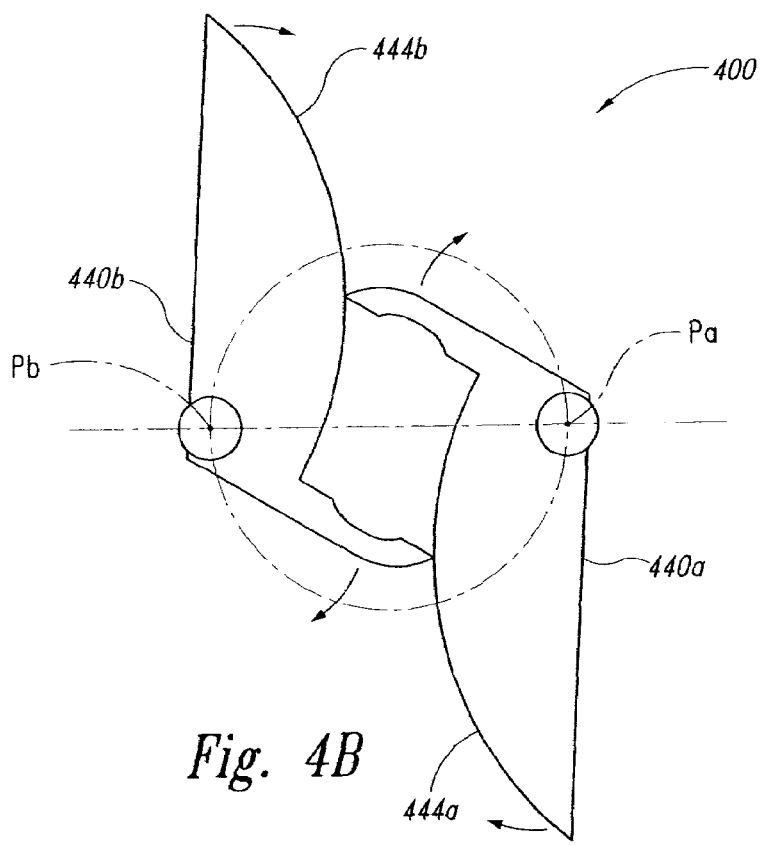

For example, FIGS. 4A and 4B are schematic top views of a radial impulse engine 400 ("engine 400") configured in accordance with another embodiment of the invention. In this embodiment, the engine 400 includes two V-chordons 440 having cylindrical surfaces 444 positioned inboard of the respective pivot axes P. In similar fashion, other engines configured in accordance with the present disclosure can have cylindrical swept surfaces positioned outboard of the respective pivot axes P.

III. Further Embodiments of Radial Impulse Internal Combustion Engines

Figure 5:
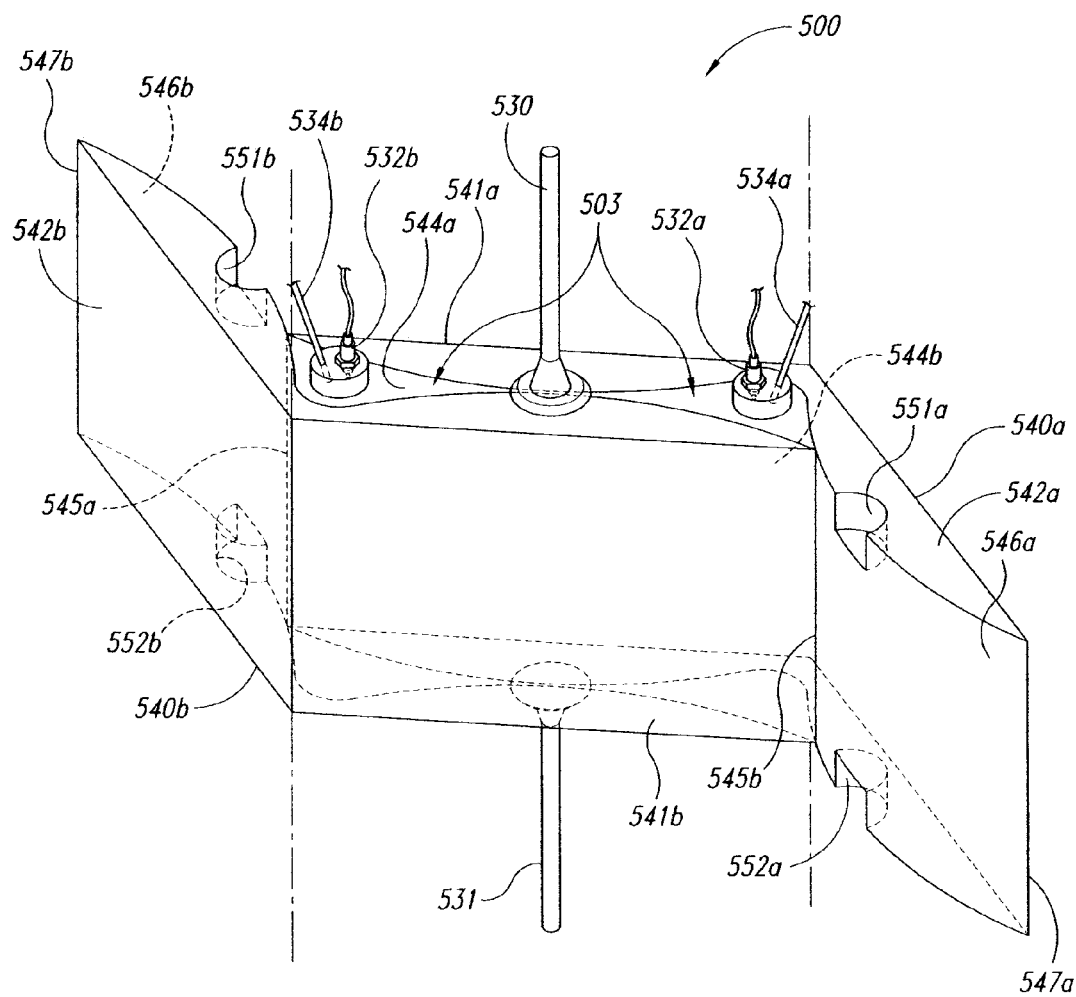
FIG. 5 is a schematic isometric view of a portion of a radial impulse engine configured in accordance with another embodiment of the invention.

FIG. 5 is a schematic isometric view of a portion of a radial impulse engine 500 ("engine 500") configured in accordance with a further embodiment of the invention In one aspect of this embodiment, the engine 500 includes a first V-chordon 540a and a second V-chordon 540b that are similar to the V-chordons described above with reference to FIGS. 1-4B. In this particular embodiment, however, each of the V-chordons 540 includes a first swept wall portion 541 (identified individually as first swept wall portions 541a and 541b) and a second swept wall portion 542 (identified individually as second swept wall portions 542a and 542b). Each of the first swept wall portions 541 includes a corresponding first swept surface 544 (identified individually as first swept surfaces 544a and 544b), and each of the second swept wall portions 542 includes a corresponding second swept surface 546 (identified individually as second swept surfaces 546a and 546b).

In the illustrated embodiment, each of the second swept surfaces 546 includes an exhaust valve cutout 551 (identified individually as exhaust valve cutouts 551a and 551b) and an intake valve cutout 552 (identified individually as intake valve cutouts 552a and 552b). As described in greater detail below, the exhaust valve cutouts 551 are configured to accommodate an exhaust valve 530 as it extends into a combustion chamber 503. Similarly, the intake valve cutouts 552 are configured to accommodate an intake valve 531 as it extends into the combustion chamber 503.

In another aspect of this embodiment, the engine 500 further includes a first fuel injector 534a positioned proximate to a first igniter 532a (e.g. a first spark plug), and a second fuel injector 534b positioned proximate to a second igniter 532b (e.g., a second spark plug). The fuel injectors 534 are configured to inject fuel into the combustion chamber 503 for subsequent ignition by the igniters 532.

Figure 6A:
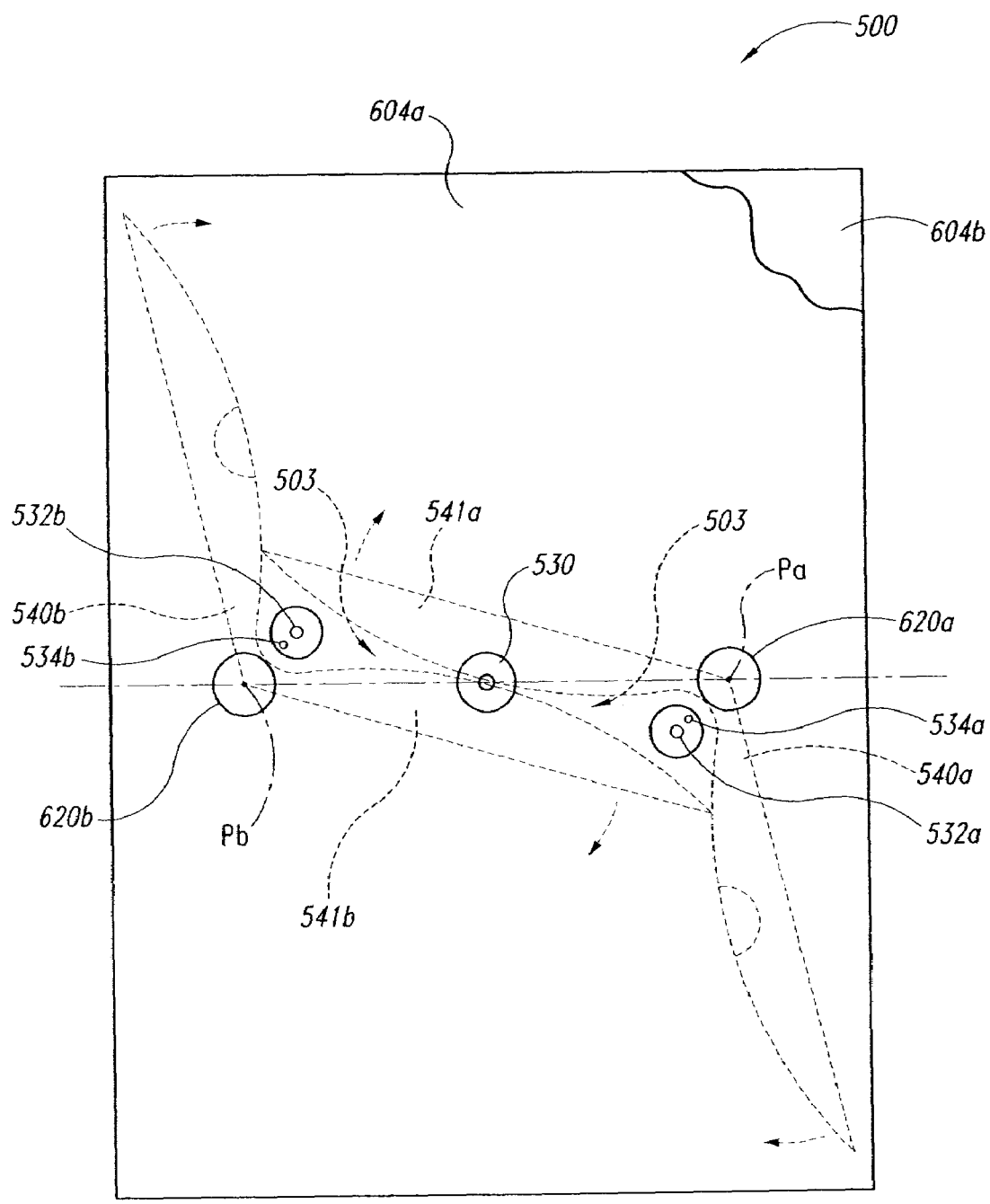
FIGS. 6A-6I are a series of top views illustrating operation of the engine of FIG. 5 in a four-stroke mode in accordance with an embodiment of the invention.

FIGS. 6A-6I are a series of top views illustrating operation of the engine 500 in a four-stroke mode in accordance with an embodiment of the invention. Referring first to FIG. 6A, each of the V-chordons 540 is attached to a corresponding wrist shaft 620 (identified individually as a first wrist shaft 620a and a second wrist shaft 620b). The wrist shafts 620 extend between a first end plate 604a and a second end plate 604b, and are configured to rotate back and forth about corresponding pivot axes P (identified individually as a first pivot axis P$_a$ and second pivot axis P$_b$). Although not shown in FIG. 6A, each of the wrist shafts 620 can be operably engaged with a crankshaft or other device for synchronizing motion of the V-chordons 540 and/or for power-takeout, as described above with reference to, for example, FIGS. 2A-2E.

In the illustrated embodiment, the fuel injectors 534 and the igniters 532 are carried by the first end plate 604a. In other embodiments, however, one or more of the fuel injectors 534 and/or the igniters 532 can be omitted or, alternatively, additional injectors and/or igniters can be located in other positions around the combustion chamber 503. For example, in another embodiment, one or more fuel injectors and/or igniters can be carried by the second end plate 604b.

In FIG. 6A, the V-chordons 540 are in a first TDC position at the end of the compression stroke. At this point in the cycle, the fuel injectors 534 have injected fuel into the combustion chamber 503, and the igniters 532 have ignited the compressed fuel/air mixture. The resulting combustion drives the first swept wall portions 541 outwardly as the V-chordons 540 rotate about the pivot axes P in the clockwise direction.

Figure 6B:
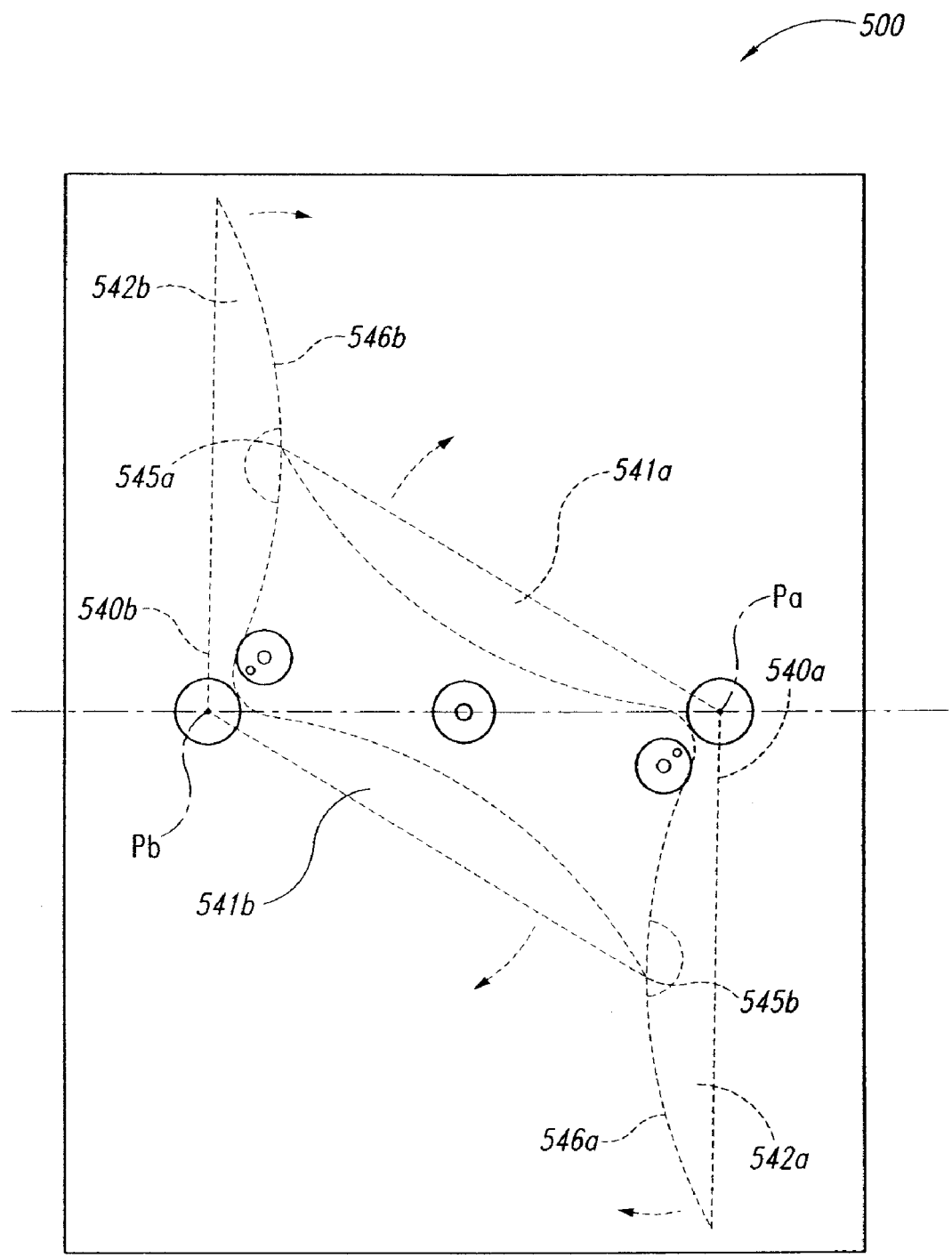
Figure 6C:
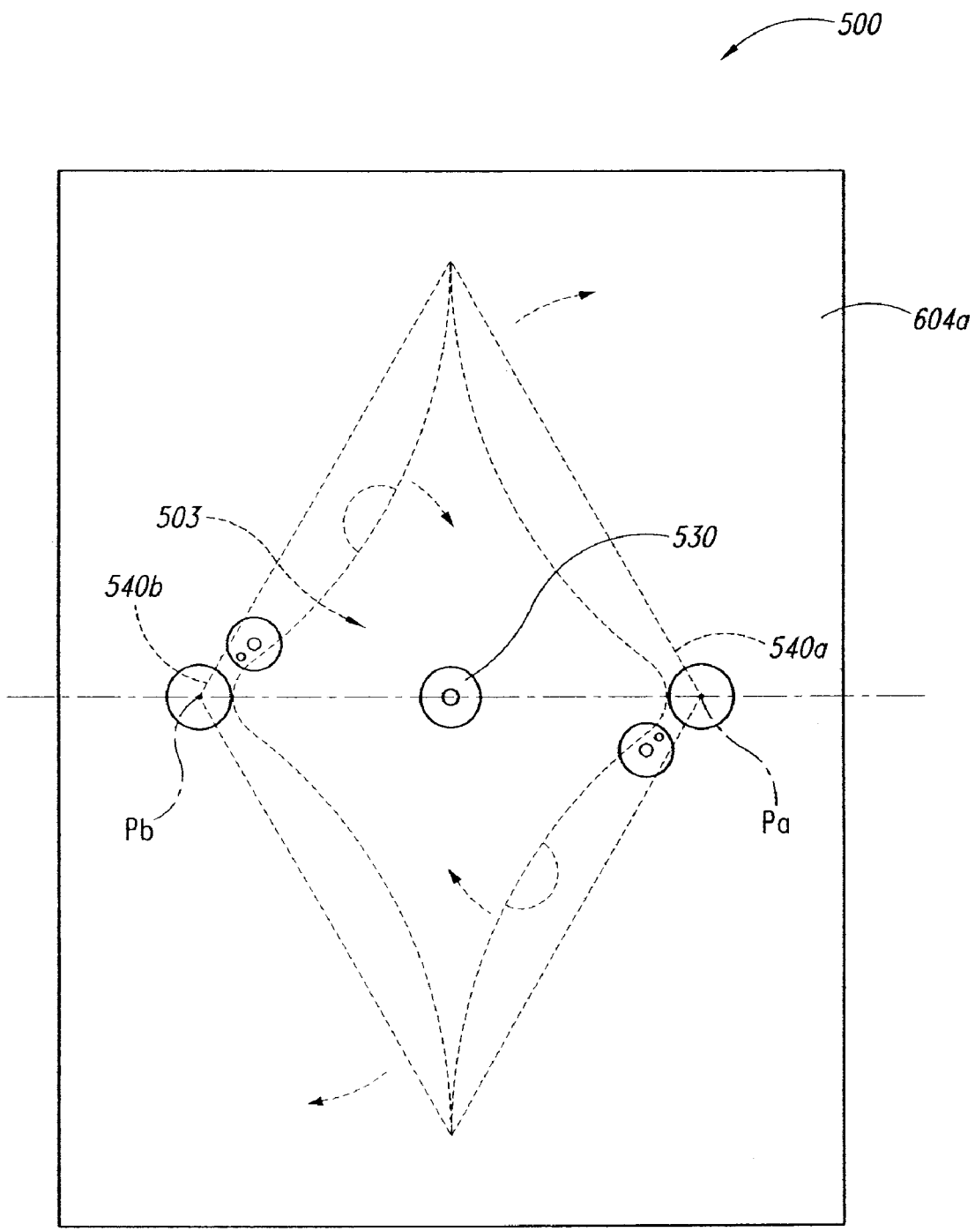

Referring next to FIG. 6B, as the V-chordons 540 continue rotating in the clockwise direction, a first distal edge portion 545a of the first swept wall portion 541a slides across the second swept surface 546b of the second swept wall portion 542b. Simultaneously, a first distal edge portion 545b of the first swept wall portion 541b slides across the second swept surface 546a of the second swept wall portion 542a. The sliding contact of the respective wall portions sufficiently seals the combustion chamber 503 to prevent the expanding exhaust gases from escaping. When the V-chordons 540 reach the midpoint of their stroke as shown in FIG. 6C (which, for ease of reference, can be referred to as the "bottom dead center" or "BDC" position), the exhaust valve 530 begins to move into the combustion chamber 503, allowing exhaust gasses to flow out of the combustion chamber 503 through an exhaust port 658 in the first end plate 604a.

Figure 6D:
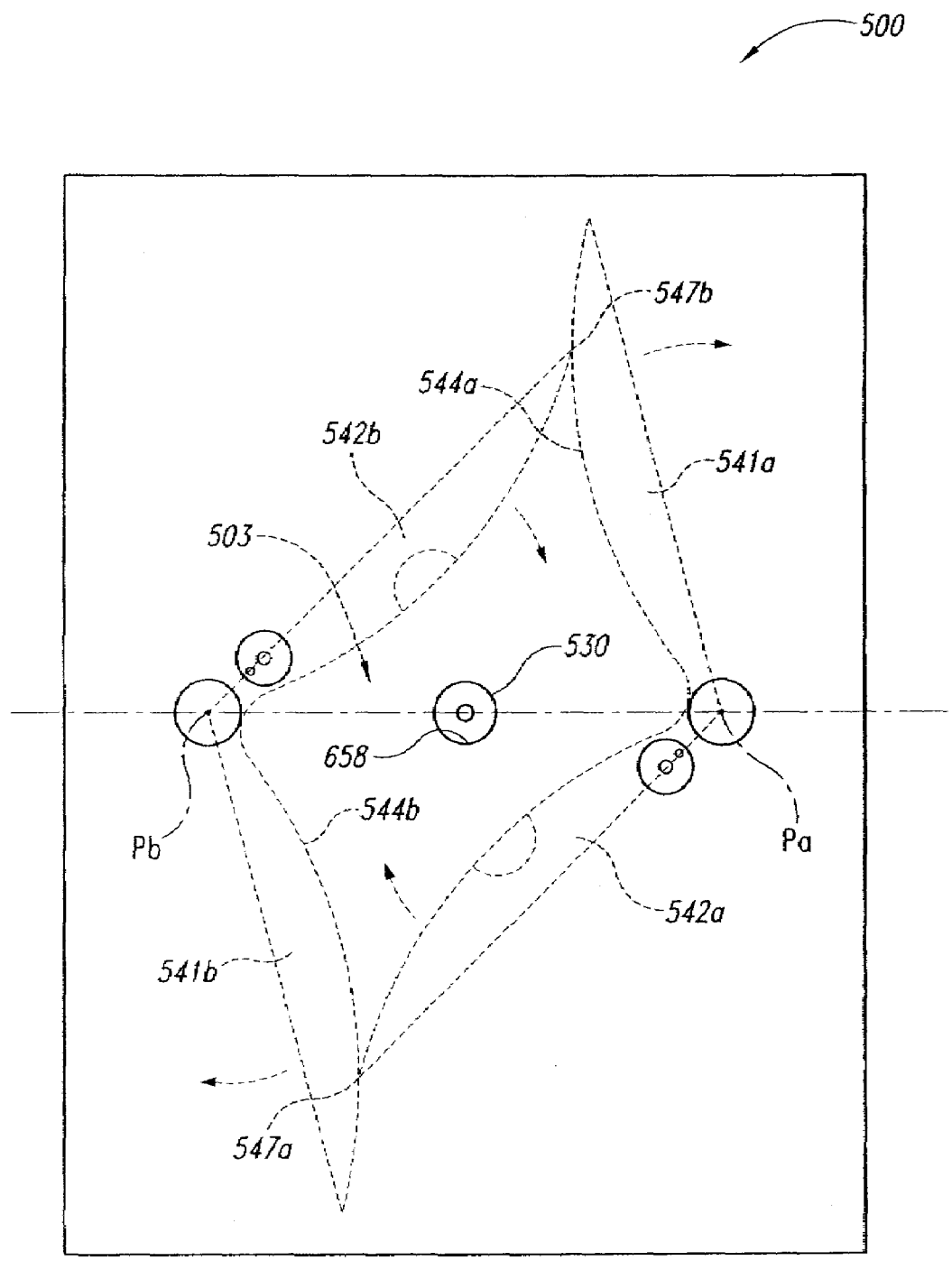

Referring next to FIG. 6D, as the V-chordons 540 continue rotating in the clockwise direction, a second distal edge portion 547a of the second swept wall portion 542a slides across the first swept surface 544b of the first swept wall portion 541b. Simultaneously, a second distal edge portion 547b of the second swept wall portion 542b slides across the first swept surface 544a of the first swept wall portion 541a. The sliding contact of the respective wall portions continues to seal the combustion chamber 503 and prevent, significant pressure leaks.

Although not shown in FIGS. 6A-6I, each of the distal edge portions 545 and 547 (and/or other portions of the V-chordons 540) can include a seal or other device to enhance sealing between adjacent surfaces. Such devices are described in detail in U.S. Provisional Patent Application No. 60/676,017, which is incorporated into the present disclosure in its entirety by reference. As the second swept wall portions 542 continue moving inwardly, they drive exhaust gasses out of the combustion chamber 503 through the open exhaust port 658.

Figure 6E:
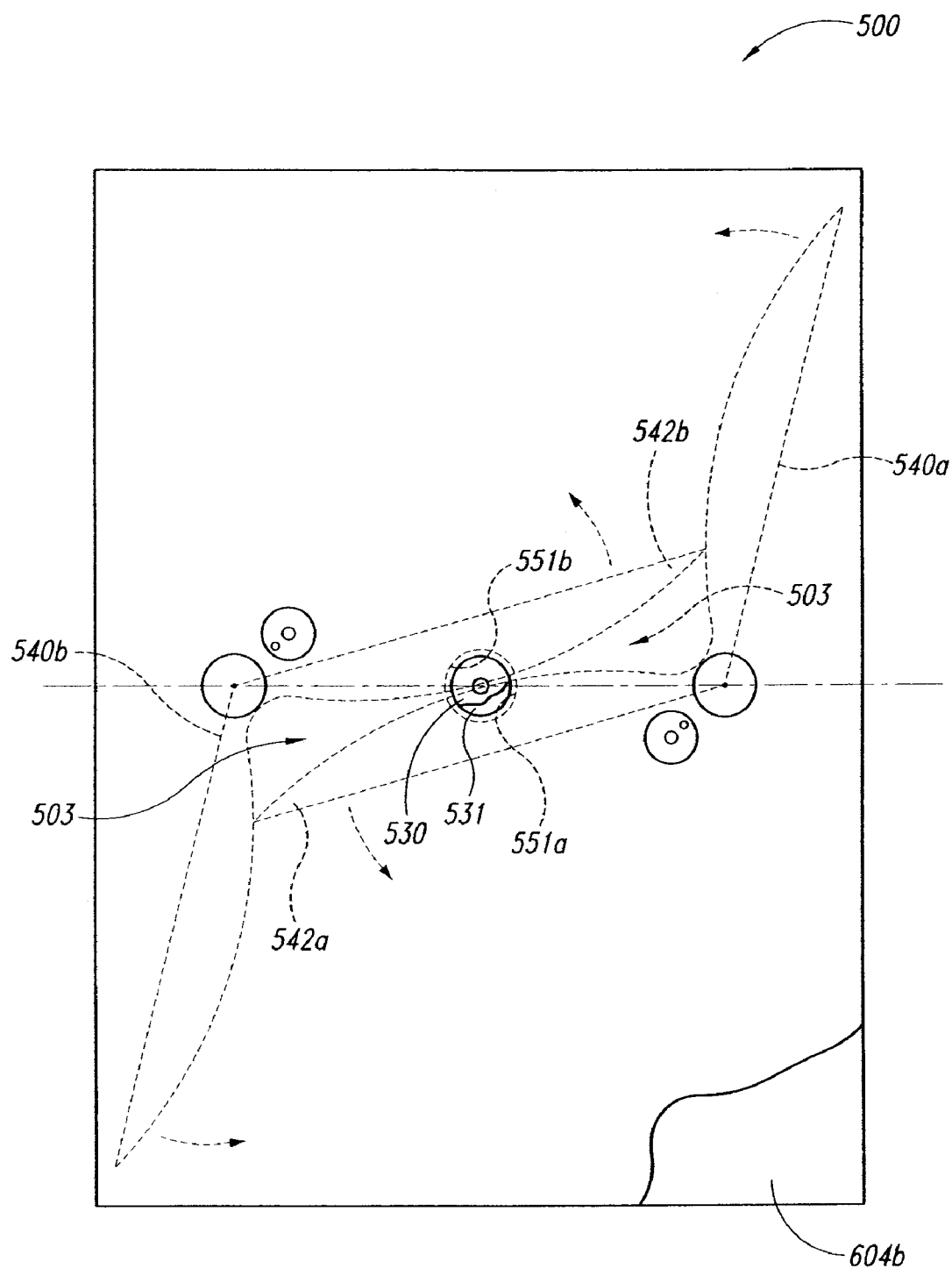

As the V-chordons 540 approach the second TDC position shown in FIG. 6E, the exhaust valve cutouts 551 (see also FIG. 5) prevent the second swept wall portions 542 from striking the open exhaust valve 530. At or about this time, the intake valve 531 (FIG. 5) starts moving into the combustion chamber 503, allowing a fresh charge of air to begin flowing into the combustion chamber 503 through the open intake port (not shown) in the second end plate 604b. The intake valve cutouts 552 (FIG. 5) prevent the second swept wall portions 542 from striking the open intake valve 531. After momentarily stopping at the second TDC position, the V-chordons 540 start rotating outwardly in the counterclockwise direction.

Figure 6F:
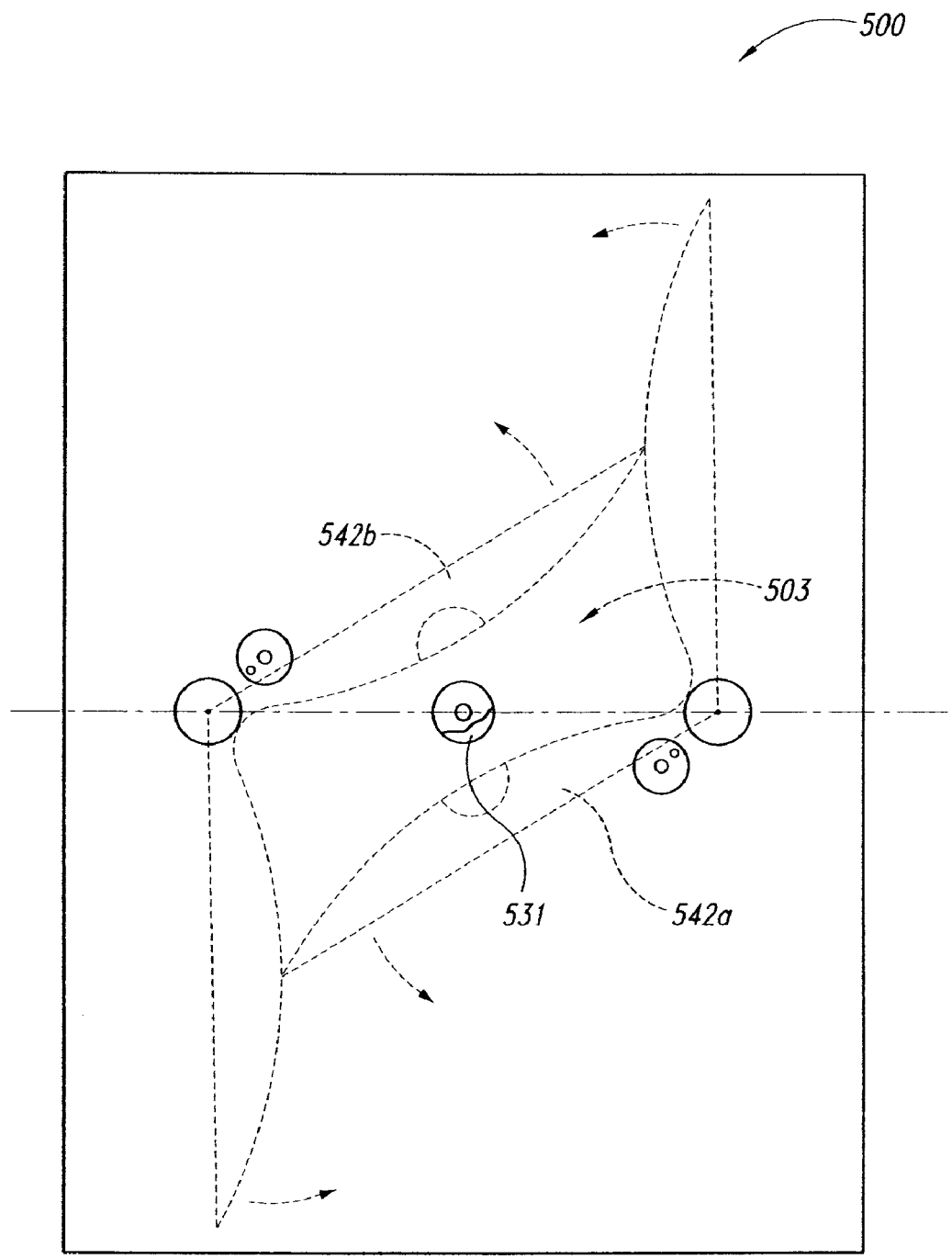
Figure 6G:
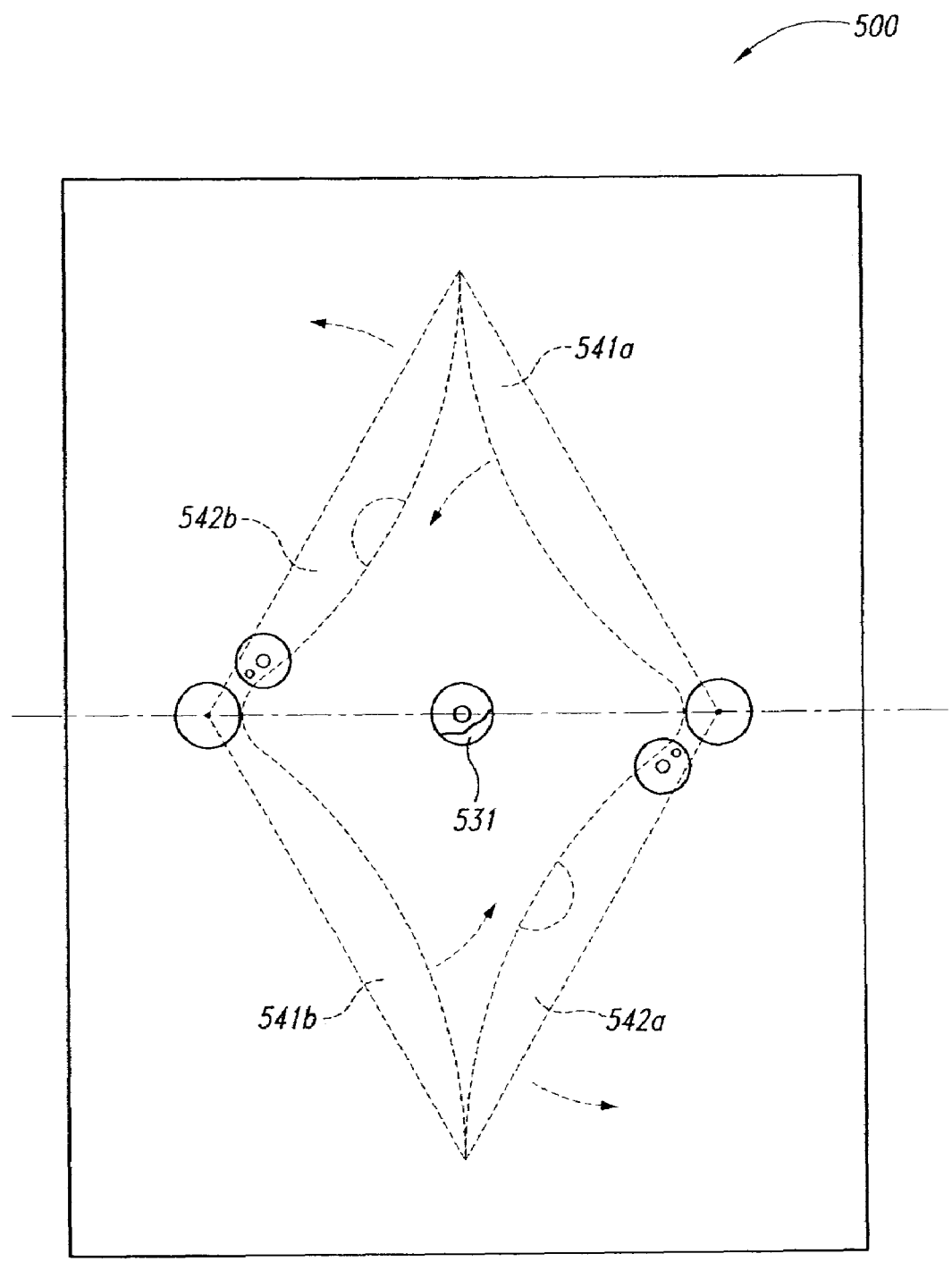
Figure 6H:
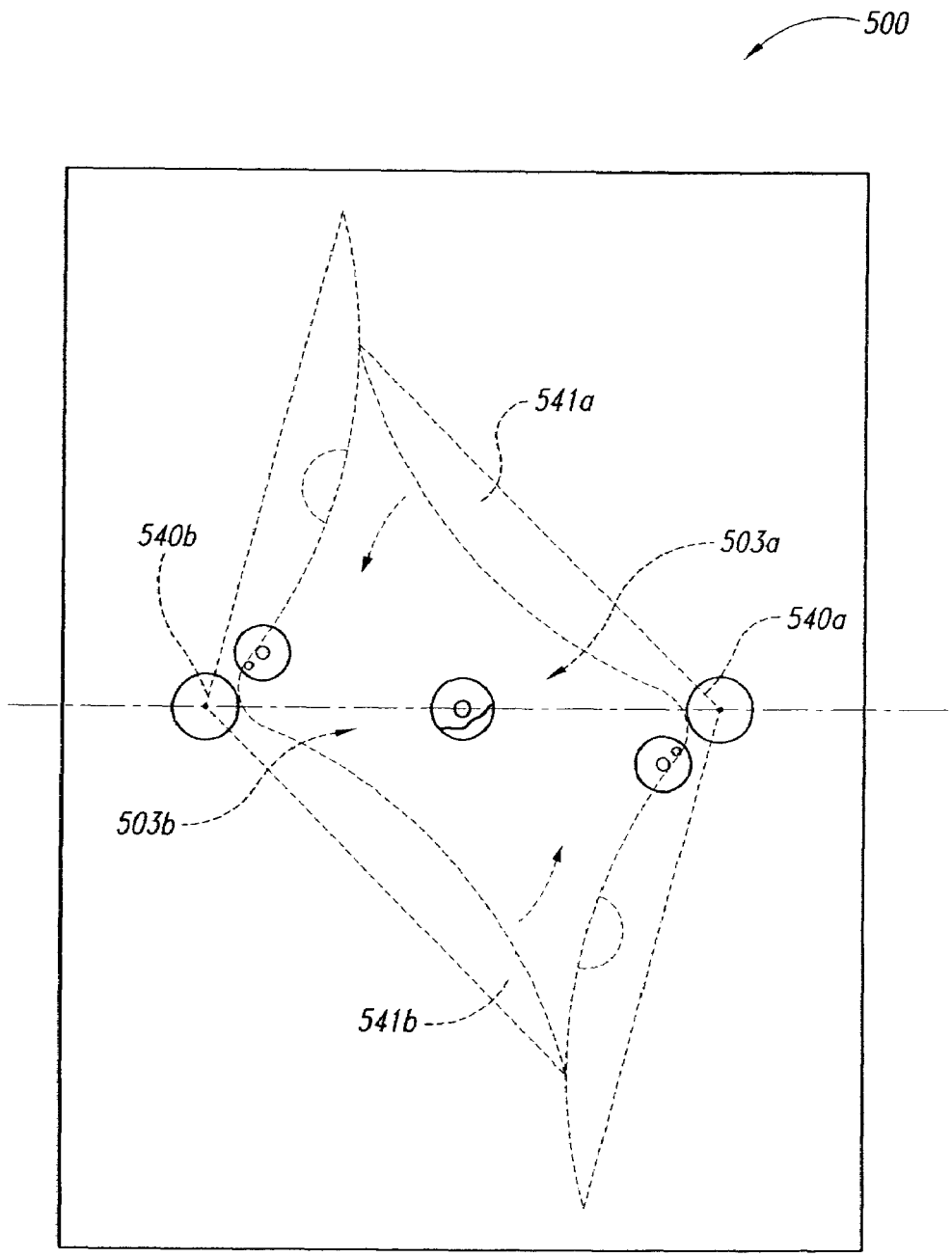
Figure 6I:
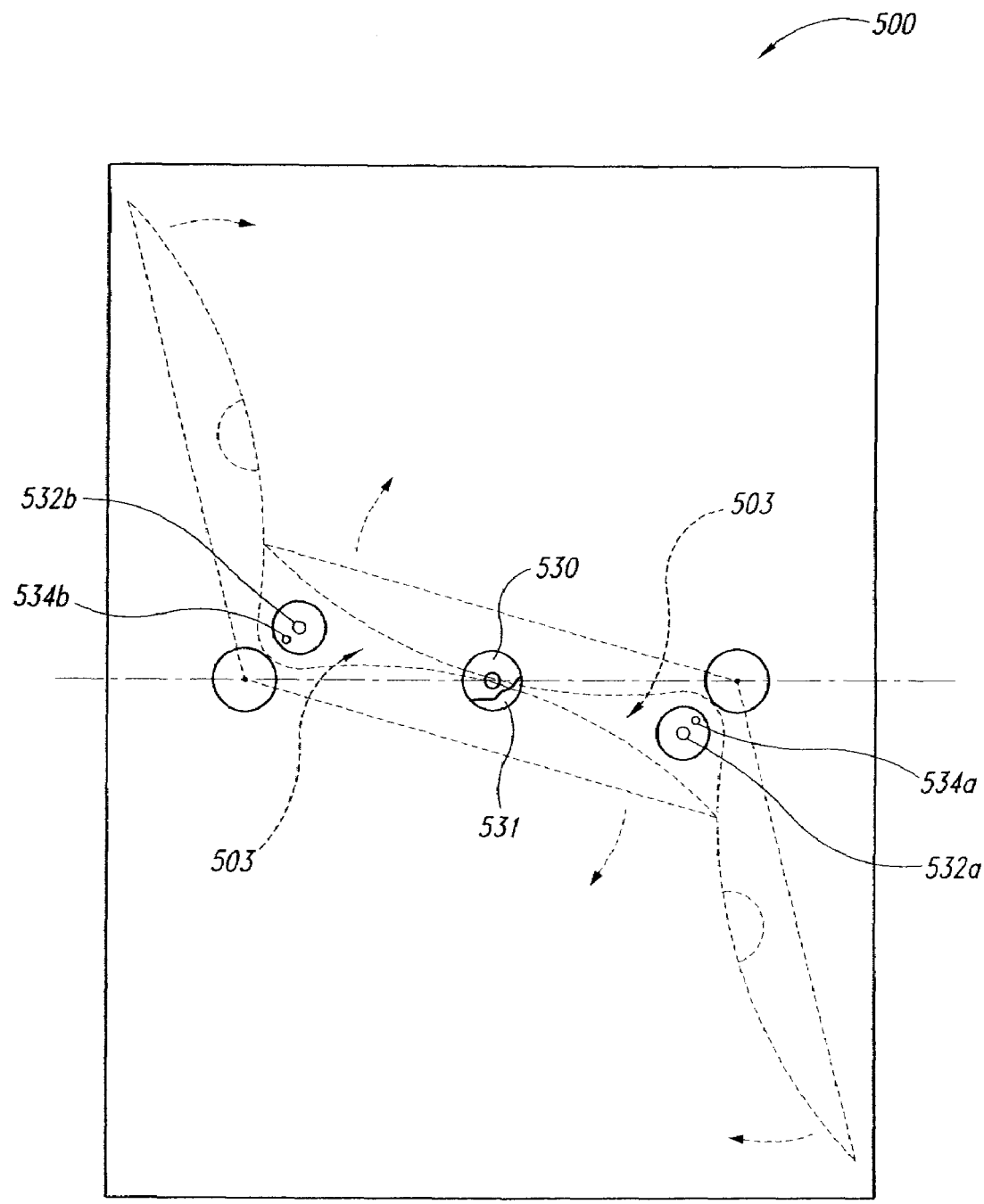

As the V-chordons 540 approach the position shown in FIG. 6F, the intake valve 531 is fully, or near-fully open, and the continued outward movement of the second swept wall portions 542 rapidly fills the combustion chamber 503 with the fresh intake charge. When the V-chordons 540 again reach the midpoint or BDC position shown in FIG. 6G, the intake valve 531 closes so that further inward motion of the first swept wall portions 541, as shown in FIG. 6H, compresses the intake charge. As the V-chordons 540 return to the first TDC position shown in FIG. 6I, the fuel injectors 534 inject fuel into the combustion chamber 503 for subsequent ignition by the igniters 532. At this point in the cycle, both the intake valve 531 and the exhaust valve 530 are fully closed. Consequently, the resulting combustion drives the V-chordons 540 outwardly in the clockwise direction and the four-stroke cycle described above repeats.

As those of ordinary skill in the art will appreciate, various engines at least generally similar in structure and function to the engine 500 described above can be equipped with other intake, exhaust, and ignition system configurations without departing from the spirit or scope of the present disclosure. For example, other engines can include one or more transfer ports in the end walls 604 (FIG. 6A) and/or the swept wall portions 541 or 542 for introduction of intake charges into, and/or for expelling exhaust gases out of, the combustion chamber 503. Alternatively, the intake valve 531 and/or the exhaust valve 530 can be replaced by poppet valves that extend through the chordon faces and are actuated by relative movement between the V-chordons 540 and adjacent structures. Similarly, the fuel injectors 534 can be omitted and a carburetion system can be used to introduce a fuel/air mixture into the combustion chamber 503. In another embodiment, an engine at least generally similar in structure and function to the engine 500 described above can be configured to operate in a two-stroke mode without departing from the spirit or scope of the present disclosure.

In yet other embodiments of the invention, two or more engines similar to the engine 500, the engine 100 (FIGS. 1-3), or the engine 400 (FIGS. 4A and 4B) can be coupled together in various bi-axial and/or co-axial multi-chamber arrangements as described in detail in related U.S. Provisional Patent Application No. 60/676,017. In still further embodiments, various systems having V-chordons at least generally similar in structure and function to the V-chordons 140, 440, and 540 described above can be utilized in various pumps and compressor systems. Accordingly, the present invention is not limited to the particular embodiments described above, but extends to any and all embodiments encompassing one or more of the inventive aspects described herein.

Figure 7A:
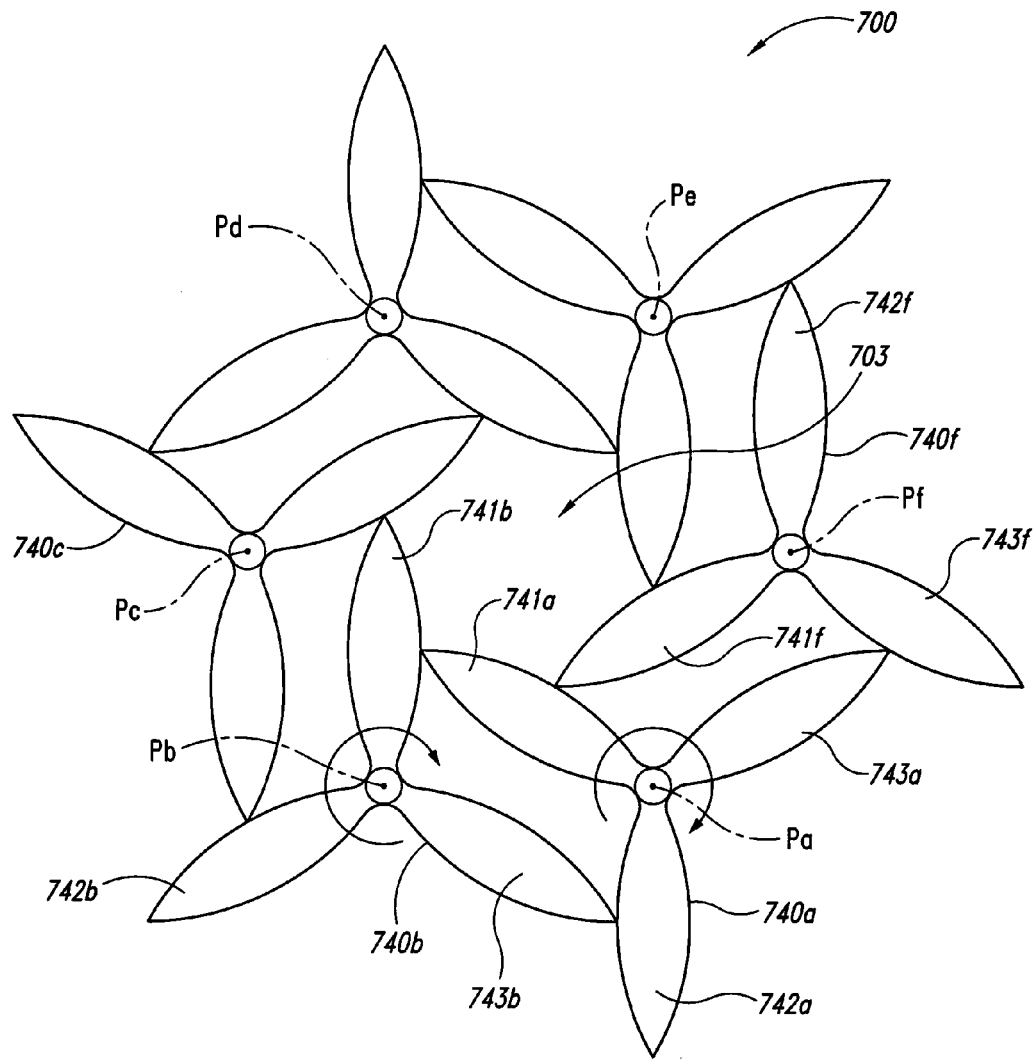
FIGS. 7A-7B are schematic top views of a portion of a radial impulse engine having a plurality of tri-chordons configured in accordance with a further embodiment of the invention.
Figure 7B:
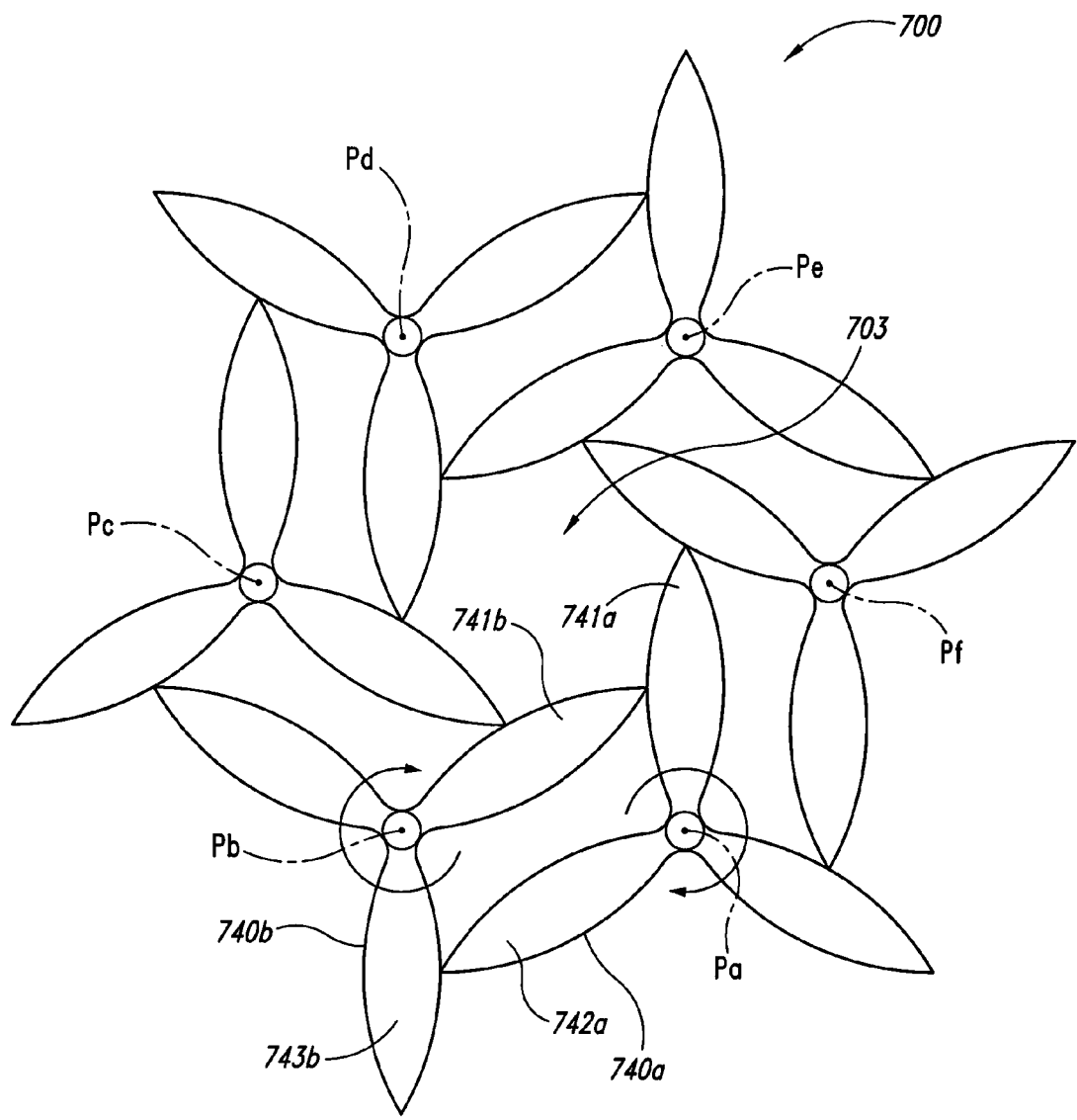

FIGS. 7A-7B are schematic top views of a portion of an engine 700 having a plurality of movable members 740 (identified individually as movable members 740a-f) configured in accordance with another embodiment of the invention. For ease of reference, the movable members 740 are referred to herein as "tri-chordons 740." Referring to FIGS. 7A and 7B together, in this embodiment, each of the tri-chordons 740 includes a first swept wall portion 741, a second swept wall portion 742, and a third swept wall portion 743. During engine operation, each of the tri-chordons 740 pivots back and forth in unison about a corresponding pivot axis P (identified individually as pivot axes Pa-f). As the tri-chordons 740 pivot, the swept wall portions 741, 742 and 743 of each tri-chordon 740 cooperate with the adjacent swept wall portions 741, 742 and 743 of the two neighboring tri-chordons 740 in the manner described above for the engine 500 of FIGS. 5-6I. For example, the first swept wall portion 741a and the second swept wall portion 742a of the first tri-chordon 740a cooperate with the first swept wall portion 741b and the third swept wall portion 743b, respectively, of the second tri-chordon 740b. In this manner, each pair of cooperating tri-chordons (e.g., the first tri-chordon 740a and the second tri-chordon 740b) can function as an independent "sub-engine." In other embodiments, the chambers between cooperating tri-chordons 740 can be configured to operate as pumps, compressors, etc.

Figure 8:
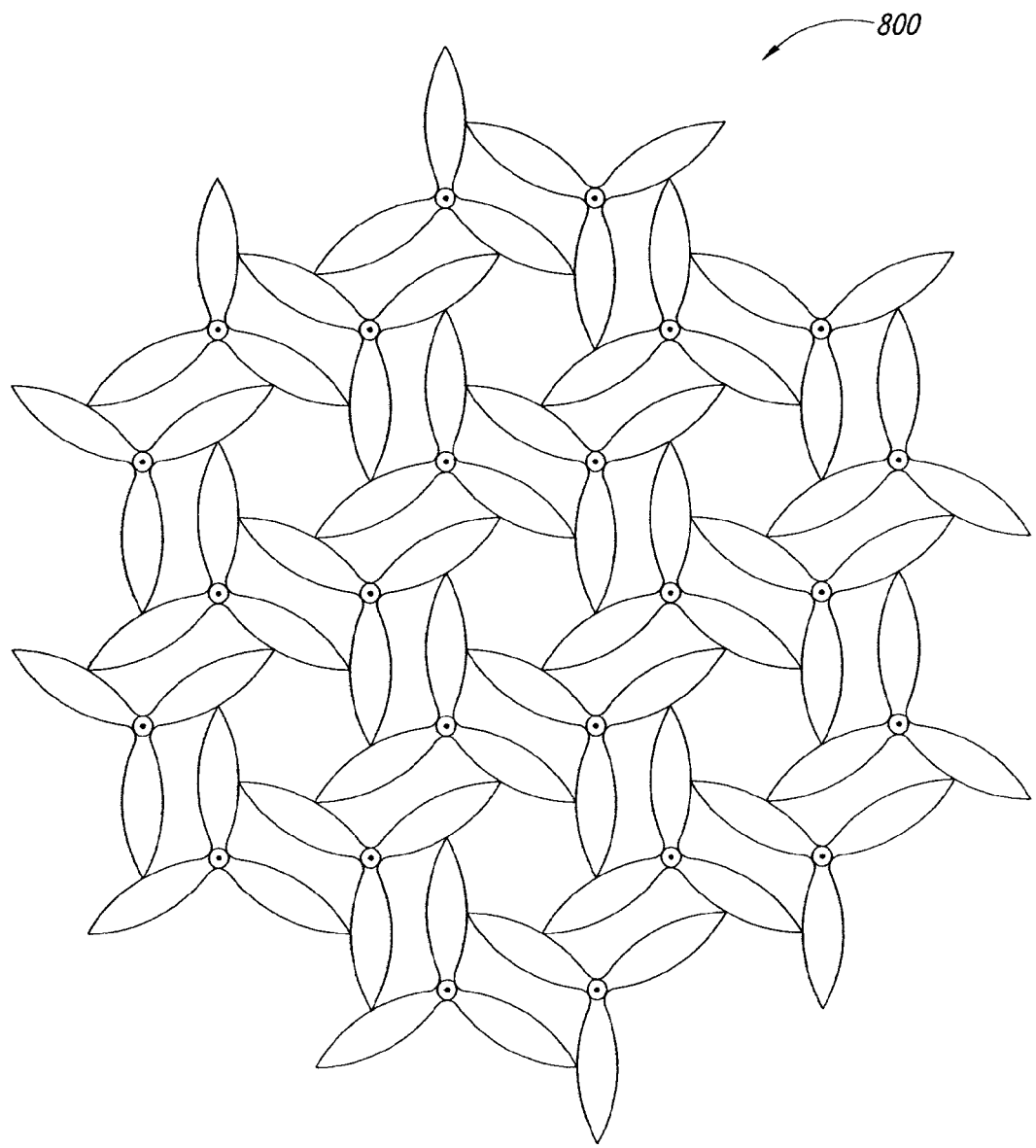
FIG. 8 is a schematic top view of a radial impulse engine having a relatively high number of tri-chordons in accordance with yet another embodiment of the invention.

In yet other embodiments, adjacent pairs of tri-chordons 740 can be configured to operate in alternating cycles so that, for example, one tri-chordon is rotating outwardly on the combustion stroke as the adjacent tri-chordon is rotating inwardly on the compression stroke. In a further embodiment, an inner chamber 703 of the engine 700 can be configured to operate as another engine, pump, or compressor chamber. As FIG. 8 illustrates, the number of tri-chordons that can be combined in the foregoing manner is virtually limitless.

Figure 9:
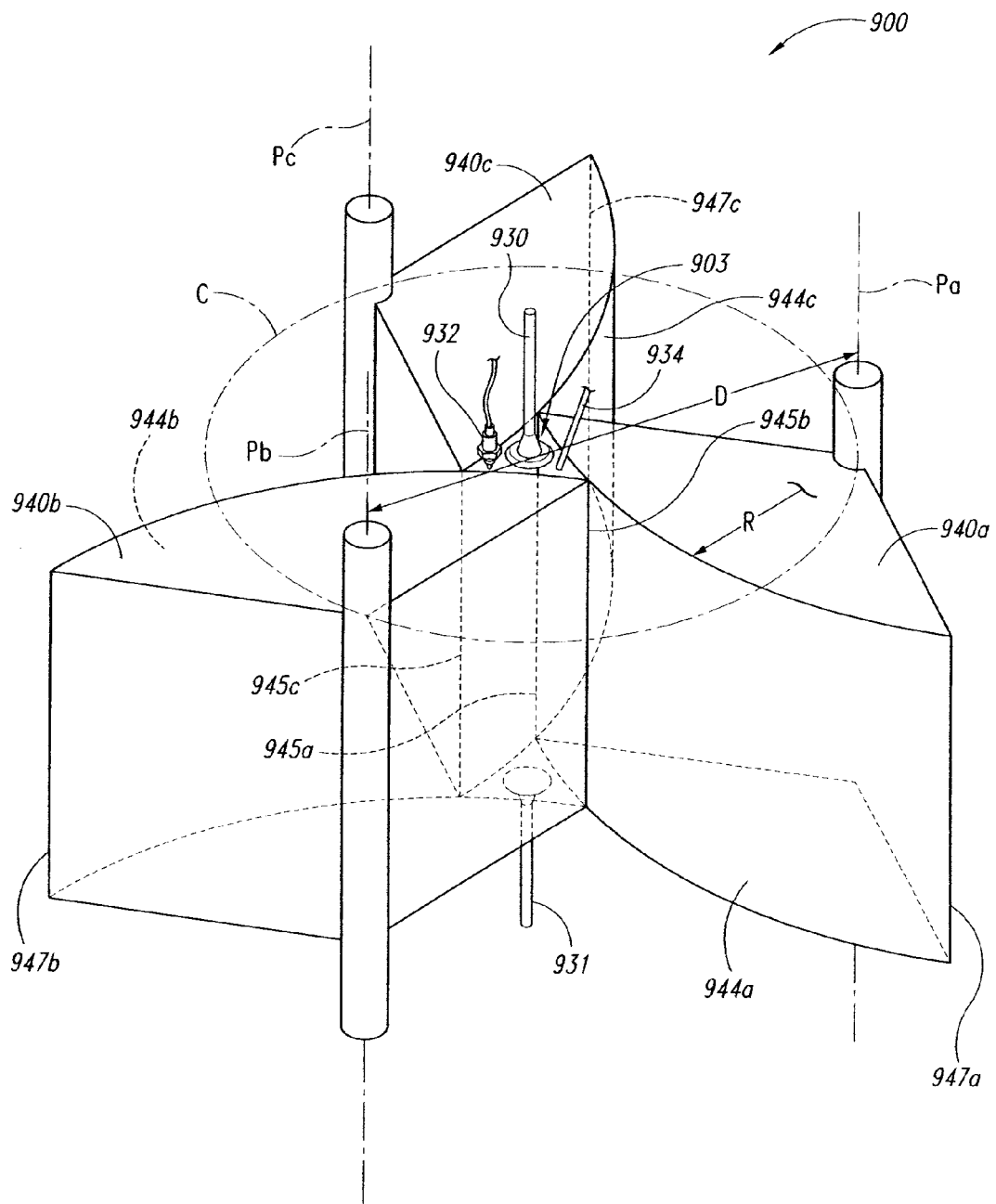
FIG. 9 is a schematic isometric view of a portion of a radial impulse engine configured in accordance with a further embodiment of the invention.

FIG. 9 is an isometric view of a portion of a radial impulse engine 900 ("engine 900") configured in accordance with another embodiment of the invention. The engine 900 includes a plurality of movable members or chordons 940 (identified individually as chordons 940a-940c) configured to rotate back and forth about corresponding pivot axes P (identified individually as pivot axes Pa-c). The pivot axes P are evenly spaced around a circle C. In one aspect of this embodiment, each of the chordons 940 has a cylindrical swept surface 944 (identified individually as swept surfaces 944a-c) extending between a first distal edge portion 945 (identified individually as first distal edge portions 945a-c) and a second distal edge portion 947 (identified individually as second distal edge portions 947a-c). Each of the swept surfaces 944 has a radius of curvature R that is equivalent (or at least approximately equivalent) to a straight line distance D between adjacent pivot axes P.

In another aspect of this embodiment, the engine 900 further includes a fuel injector 934 and an igniter 932 positioned proximate to a combustion chamber 903. As described in greater detail below, an intake valve 931 opens into the combustion chamber 903 at selected times during engine operation to admit fresh intake charges through an associated intake port (not shown). An exhaust valve 930 also opens into the combustion chamber 903 at selected times during engine operation to allow exhaust gasses to escape through an associated exhaust port (also not shown).

Figure 10A:
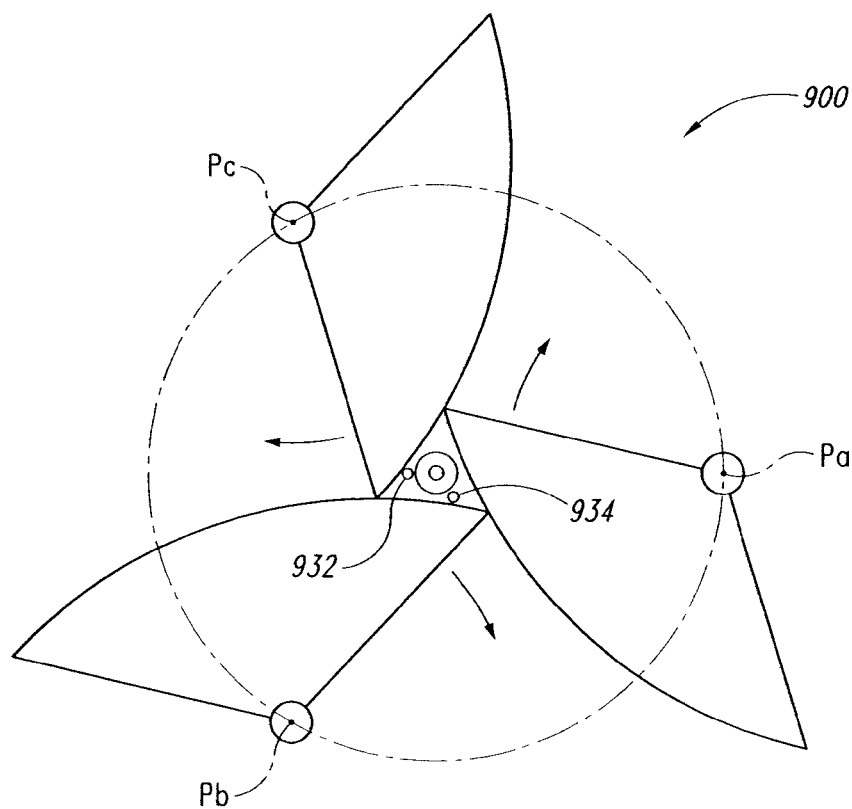
FIGS. 10A-10D are a series of schematic top views illustrating operation of the engine of FIG. 9 in a four-stroke mode in accordance with another embodiment of the invention.

FIGS. 10A-10D are a series of schematic top views illustrating operation of the engine 900 in a four-stroke mode in accordance with an embodiment of the invention. Referring first to FIG. 10A, in this view the chordons 940 are at the innermost part of their pivotal stroke which, for ease of reference, can be referred to as the TDC position on the compression stroke. At this point in the cycle, the fuel injector 934 has injected fuel into the combustion chamber 203 and the igniter 932 has ignited the compressed fuel/air mixture. The resulting combustion drives the chordons 940 outwardly about the pivot axes P in the clockwise direction.

Figure 10B:
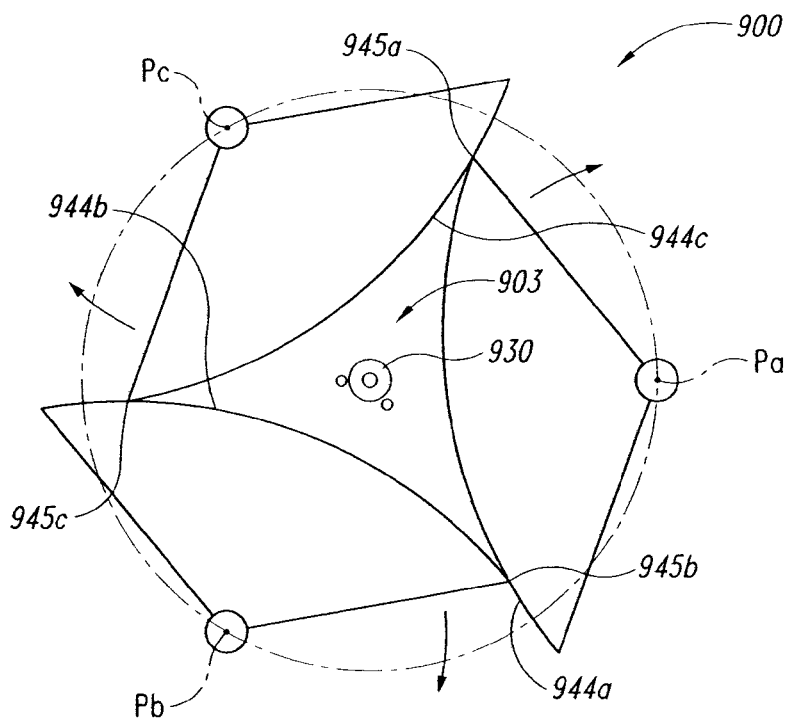

As the chordons 940 continue rotating outwardly toward the position of FIG. 10B, the first distal edge portion 945 of each of the chordons 940 slides across the swept surface 944 of the adjacent chordon 940 to seal the expanding combustion chamber 903. In addition, at this point in time the exhaust valve 930 starts to open, allowing exhaust gasses to begin flowing out of the combustion chamber 903.

Figure 10C:
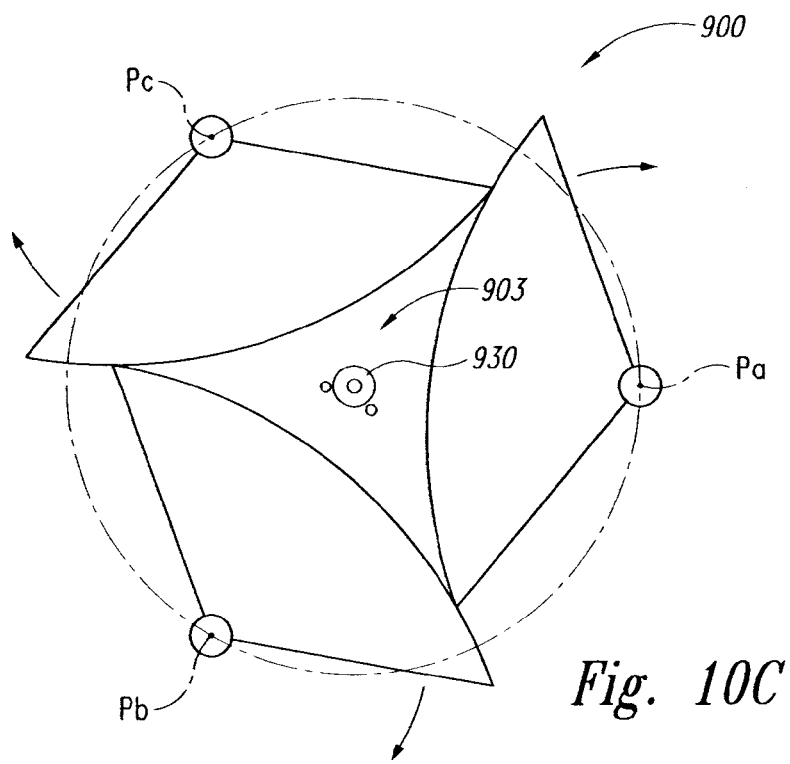
Figure 10D:
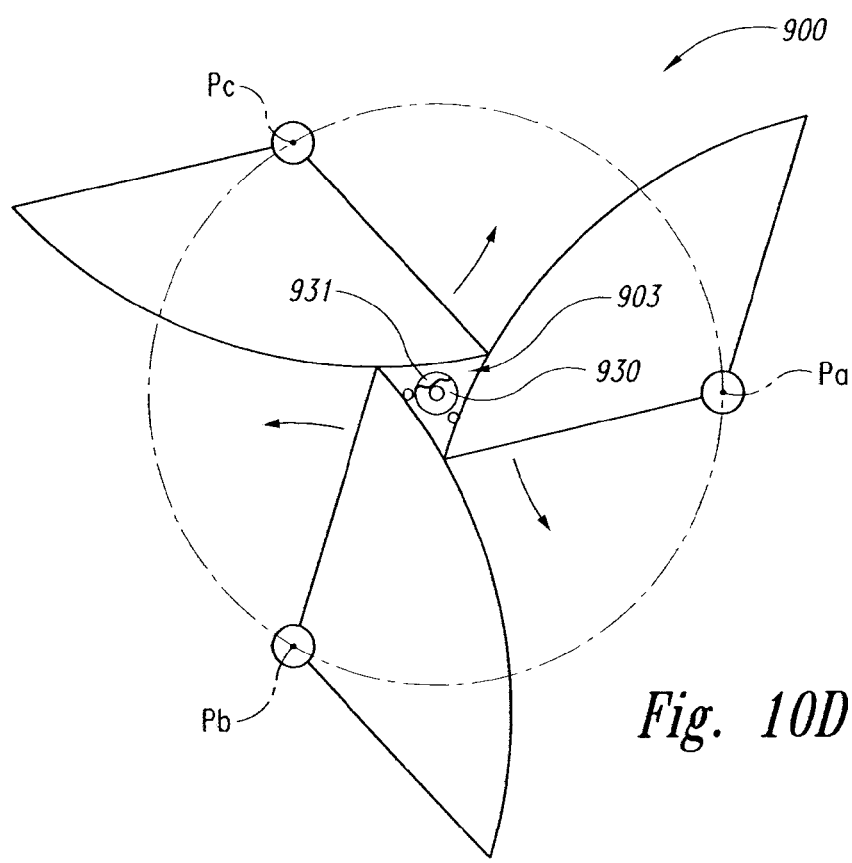

Referring next to FIG. 10C, continued rotation of the chordons 940 in the clockwise direction pushes the exhaust gasses out of the combustion chamber 903 as the combustion chamber 903 starts to contract. As the chordons 940 approach the TDC position on the exhaust stroke as shown in FIG. 10D, the exhaust valve 930 starts to close and the intake valve 931 starts to open, allowing a fresh intake charge to begin flowing into the combustion chamber 903. When the chordons 940 reach the position of FIG. 10D, the chordons 940 stop and begin rotating in the counterclockwise direction about their respective pivot axes P.

The intake valve 931 continues to open as the chordons 940 approach the position shown in FIG. 10C, allowing the fresh intake charge to fill the combustion chamber 903. When the chordons 940 reach the position of FIG. 10C, the intake valve 931 starts to close so that continued rotation of the chordons 940 in the counterclockwise direction compresses the intake charge. When the chordons 940 reach the TDC position shown in FIG. 10A, the intake charge is fully compressed. At or about this time, the fuel injector 934 injects a fresh charge of fuel into the combustion chamber 903 and the igniter 932 ignites the compressed fuel/air mixture. The resulting combustion drives the chordons 940 outwardly in the clockwise direction and the cycle described above repeats.

Figure 11:
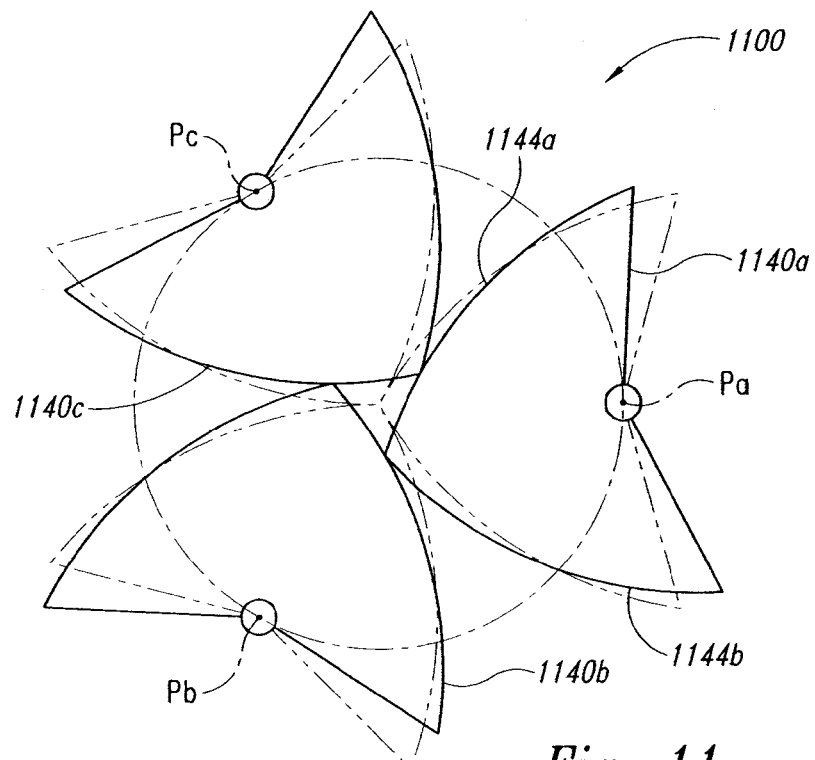
FIG. 11 is a schematic top view of a portion of a radial impulse engine that is similar to the engine described above with reference to FIGS. 9-10D.

FIG. 11 is a schematic top view of a portion of a radial impulse engine 1100 ("engine 1100") that is similar to the engine 900 described above with reference to FIGS. 9-10D. For example, the engine 1100 includes three chordons 1140 (identified individually as chordons 1140a-c) configured to pivot about corresponding pivot axes P (identified individually as pivot axes Pa-c). In this particular embodiment, however, each of the chordons 1140 includes two swept surfaces 1144 (identified individually as a first swept surface 1144a and second swept surface 1144b). The two-swept-surface chordon configuration of FIG. 11 can be thought of as two of the chordons 940 of FIG. 9 positioned side-by-side. Having two swept surfaces configured in this manner enables the chordons 1140 to continue rotation beyond the TDC position during engine operation, as shown by the phantom lines in FIG. 11. This feature allows the engine 1100 to operate with longer reciprocating strokes than the engine 900 described above. In another embodiment, this feature can also allow the engine 1100 to operate with unidirectional chordon rotation if desired, thereby omitting any back-and-forth cyclic motion.

Figure 12A:
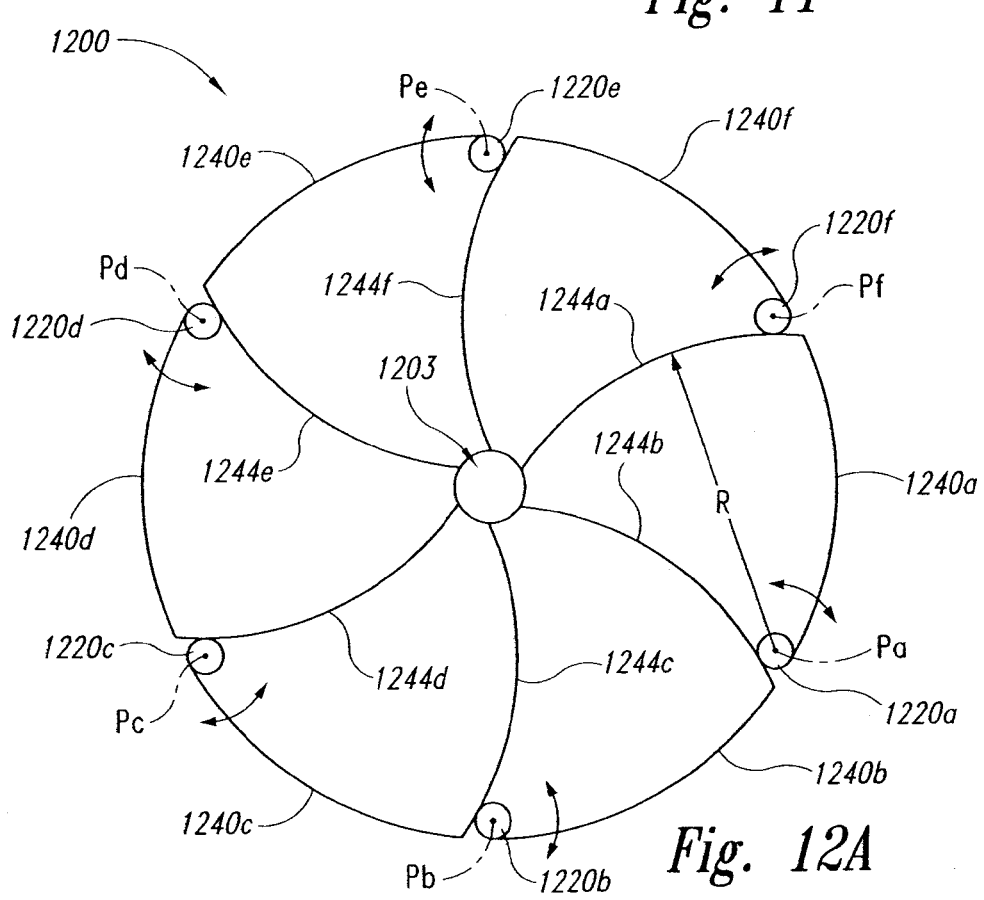
FIGS. 12A and 12B are schematic top views of a portion of a radial impulse engine configured in accordance with yet another embodiment of the invention.
Figure 12B:
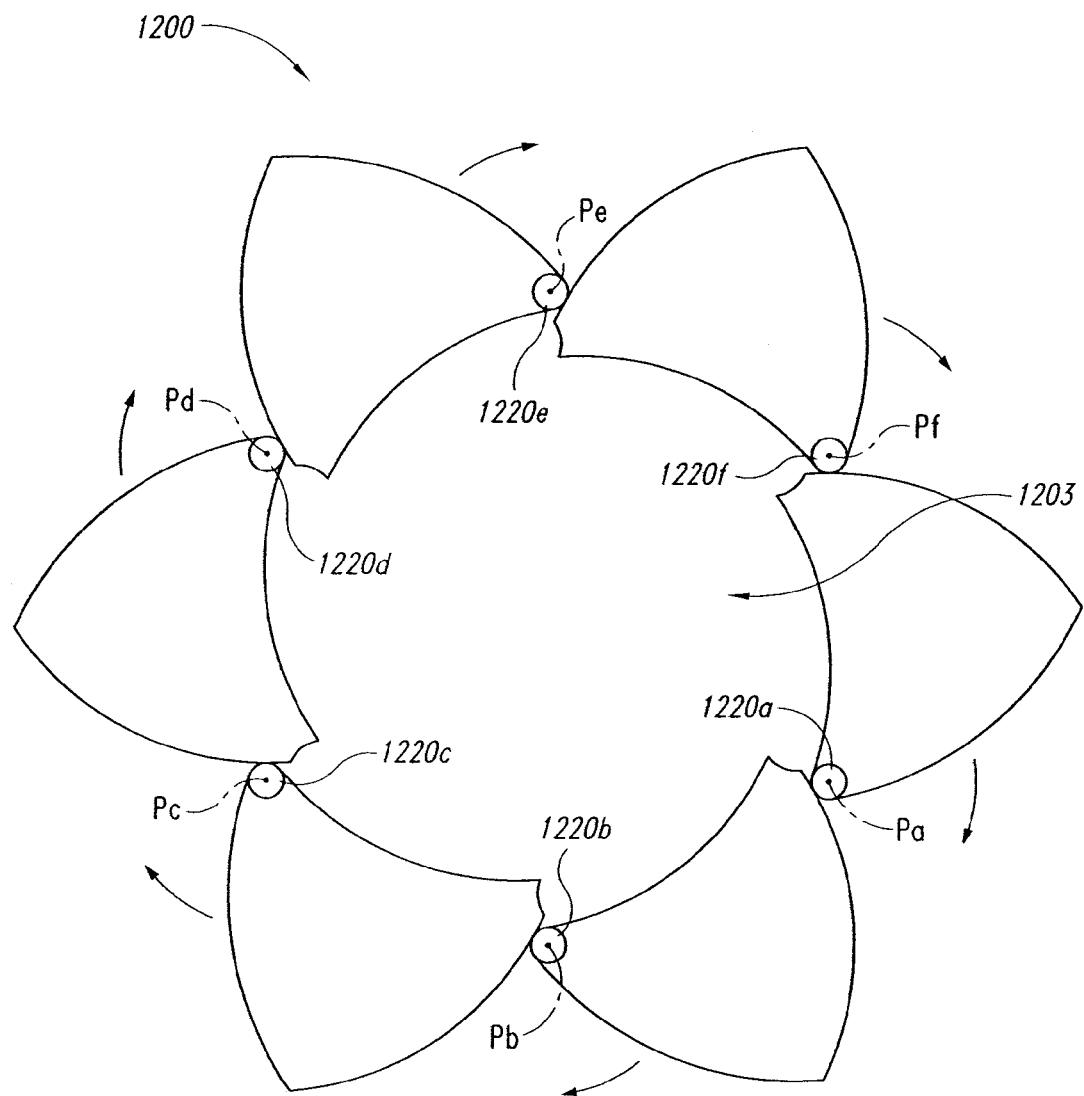

FIGS. 12A-12B are schematic top views of a portion of a radial impulse engine 1200 ("engine 1200") configured in accordance with yet another embodiment of the invention. Referring to FIGS. 12A and 12B together, the engine 1200 includes a plurality of movable members or chordons 1240 (identified individually as chordons 1240a-f) configured to rotate back and forth about corresponding pivot axes P (identified individually as pivot axes Pa-f). Each chordon 1240 includes a swept surface 1244 (identified individually as swept surfaces 1244a-f) having a radius of curvature R which is equal to the straight line distance between the pivot axis P and an adjacent wrist shaft 1220.

When the chordons 1240 are in the TDC position shown in FIG. 12A, they form a combustion chamber 1203. Ignition of an fuel/air mixture in the combustion chamber 1203 drives the chordons 1240 outwardly about the pivot axes P in the clockwise direction. As each chordon 1240 rotates, its swept surface 1244 seals against the wrist shaft 1220 of the adjacent chordon 1240, as shown in FIG. 12B. Once the chordons 1240 reach the BDC position of FIG. 12B, they stop and reverse rotation toward the TDC position of FIG. 12A.

A number of components of the engines 1100 and 1200 are not shown in FIGS. 11-12B for purposes of better illustrating the features of these particular chordon configurations. Those of ordinary skill in the relevant art will appreciate, however, that the engines 1100 and 1200 can include various combinations of the intake, exhaust, ignition, timing, power-takeout and/or other features described in detail above with reference to FIGS. 1-8 to function in both two- and four-stroke modes. In addition, other engines similar in structure and function to the engine 1200 can include more or fewer chordons similar to the chordons 1240. For example, in one other embodiment, an engine similar to the engine 1200 can include four chordons similar in structure and function to the chordons 1240. In further embodiments, other engines can include seven, eight or nine chordons similar to the chordons 1240.

Furthermore, the engines 1100 and 1200 can also include one or more of the features described in detail in related U.S. Provisional Patent Application Ser. No. 60/676,017. In addition, those of ordinary skill in the art will readily appreciate that many, if not all, of the engines described herein and in U.S. Provisional Patent Application Ser. No. 60/676,017 can include other components known in the art for performing intake, exhaust, ignition, timing, power take-out and/or other engine functions without departing from the spirit or scope of the present invention.

Figure 13A:
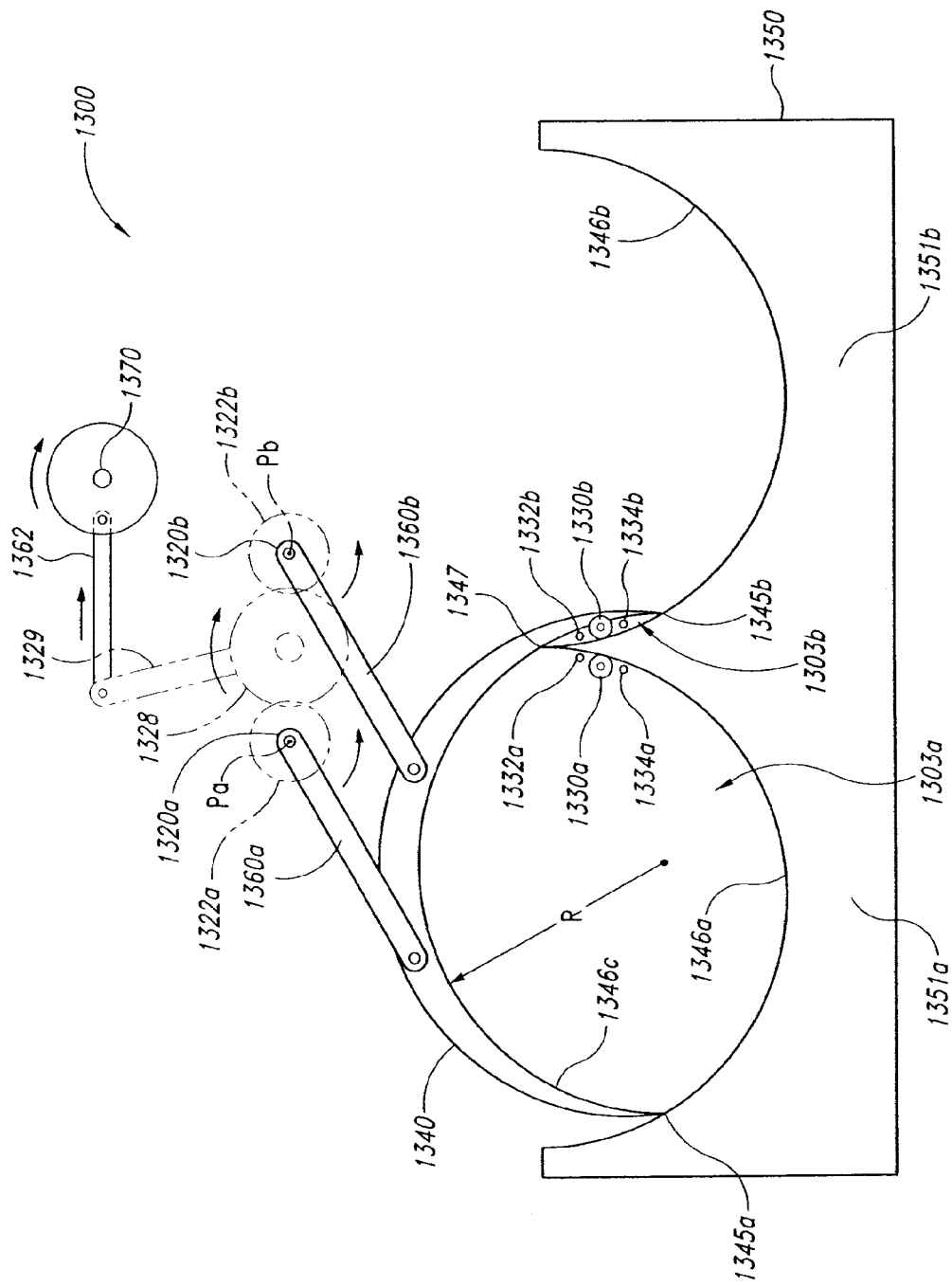
FIGS. 13A-13C are a series of schematic views of a dual-barrel radial impulse engine configured in accordance with a further embodiment of the invention.
Figure 13B:
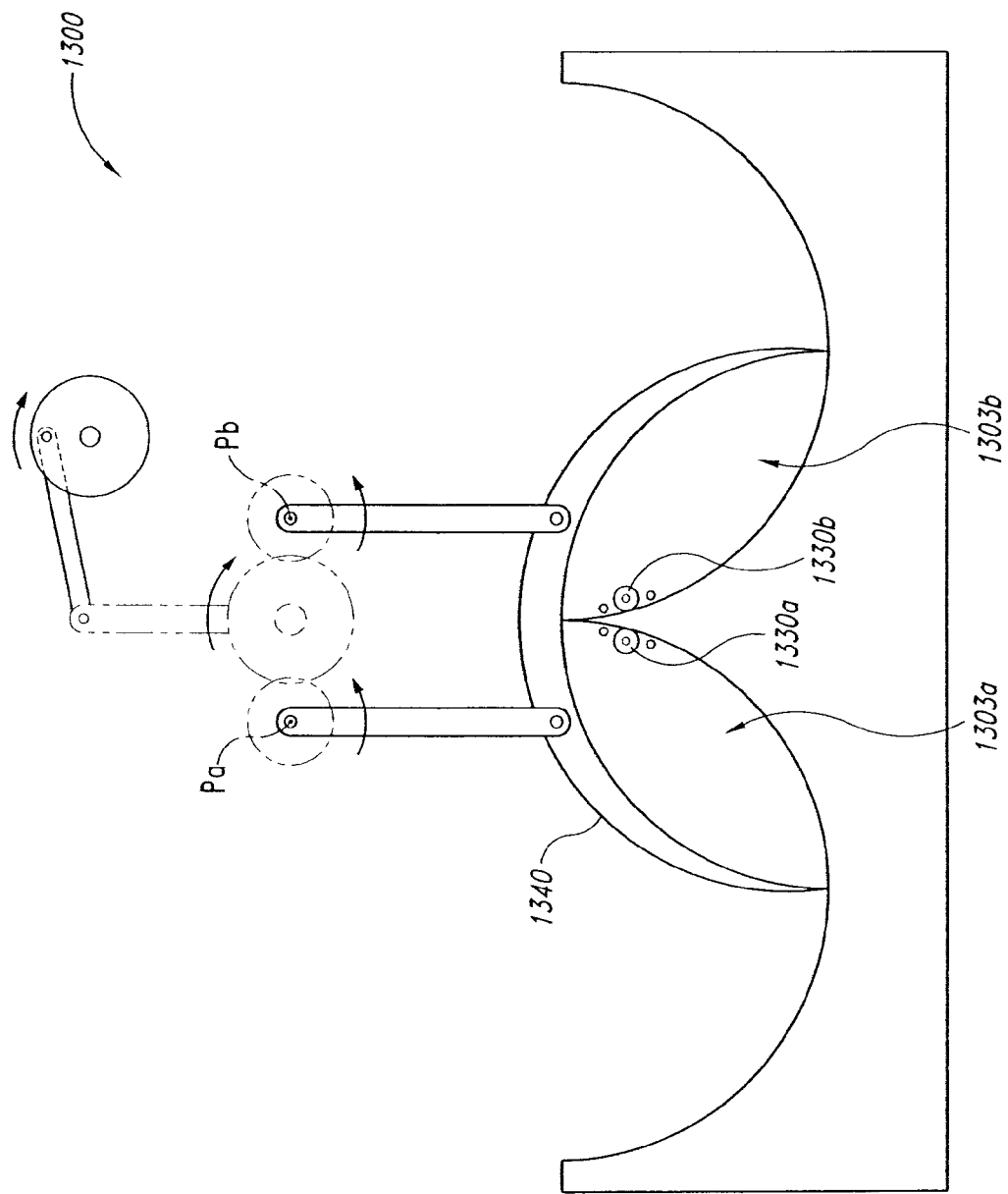
Figure 13C:
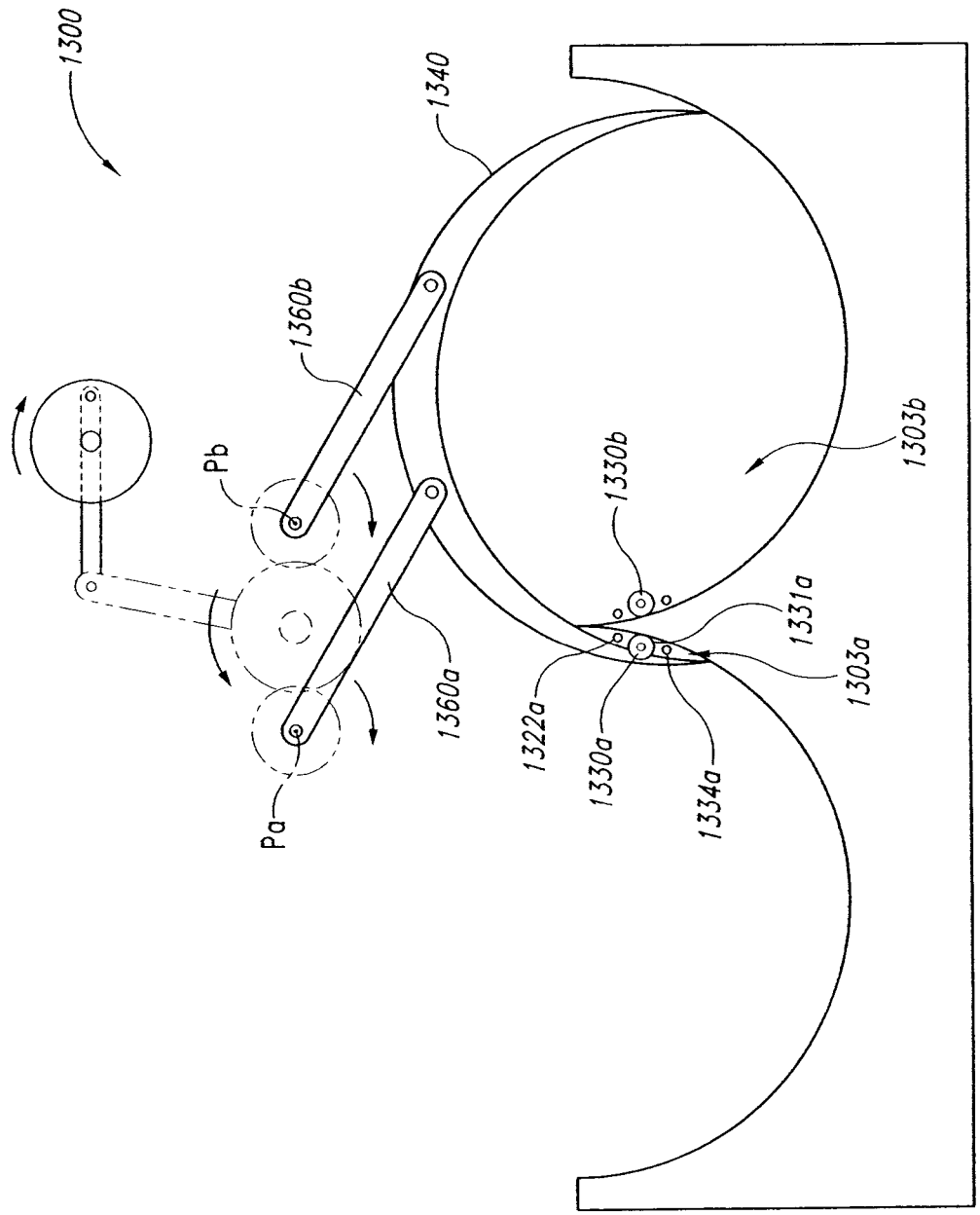

FIGS. 13A-13C are a series of schematic diagrams of a dual-barrel radial impulse engine 1300 ("engine 1300") configured in accordance with a further embodiment of the invention. Referring first to FIG. 13A, in one aspect of this embodiment, the engine 1300 includes a movable member or half-barrel chordon 1340 and a stationary block 1350. The stationary block 1350 includes a first swept surface 1346a and a second swept surface 1346b. The chordon 1340 includes a third swept surface 1346c extending between a first distal edge portion 1345a and a second distal edge portion 1345b. Each of the swept surfaces 1346 has a radius of curvature R.

In another aspect of this embodiment, the chordon 1340 is movably supported by two parallel links 1360a and 1360b. Each of the links 1360 has a length L which is equivalent to the radius of curvature R of the swept surfaces 1346. During operation of the engine 1300, the chordon 1340 swings back-and-forth on the parallel links 1360 as the first and second distal edge portions 1345 slide across the swept surfaces 1346 of the engine block 1350.

Each of the links 1360 can be operably coupled to a corresponding wrist shaft 1320 (identified individually as wrist shafts 1320a and 1320b) which is configured to pivot about a corresponding pivot axis P (identified individually as pivot axes Pa and Pb). In the illustrated embodiment, each of the wrist shafts 1320 can be operably engaged with a corresponding timing gear 1322. Each of the timing gears 1322 can be engaged with a ring gear 1328 which is operably coupled to a connecting rod 1362 via a crank-arm 1329. The connecting rod 1362 is in turn operably coupled to a crankshaft 1370.

In a further aspect of this embodiment, the engine 1300 also includes a first fuel injector 1334a, a first igniter 1332a, and a first exhaust valve 1330a positioned proximate to a first combustion chamber 1303a, and a second fuel injector 1334b, a second igniter 1332b, and a second exhaust valve 1330b positioned proximate to a second combustion chamber 1303b. Although not shown in FIG. 13A, the engine 1300 can further include first and second intake valves configured to admit fresh intake charges into the first and second combustion chambers 1303, respectively, during engine operation.

As the chordon 1340 moves to the position shown in FIG. 13A, it draws a fresh intake charge into the first combustion chamber 1303a, and compresses the intake charge in the second combustion chamber 1303b. Thus, in this position, the chordon 1340 is at the BDC position on the intake stroke for the first combustion chamber 1303a, and at the TDC position on the compression stroke for the second combustion chamber 1303b. At or about this time, the second fuel injector 1334b injects fuel into the second combustion chamber 1303b, and the second igniter 1332b ignites the compressed fuel/air mixture. The resulting combustion drives the chordon 1340 to the right as the parallel links 1360 rotate in a counterclockwise direction about their respective pivot axes P.

As the chordon 1340 swings toward the position shown in FIG. 13B, the first and second distal edge portions 1345 slide across the swept surfaces 1346 of the engine block 1350 to sufficiently seal the combustion chambers 1303. In the first combustion chamber 1303a, the intake charge is compressed as the expanding gases in the second combustion chamber 1303b continue to drive the chordon 1340 to the right. In the second combustion chamber 1303b, the second exhaust valve 1330b starts to open as the chordon 1340 approaches the position shown in FIG. 13C.

In FIG. 13C, the chordon 1340 is at the TDC position on the compression stroke for the first combustion chamber 1303a, and at the BDC position on the power stroke for the second combustion chamber 1303b. At or about this time, the first fuel injector 1334a injects fuel into the first combustion chamber 1303a and the compressed fuel/air mixture is ignited by the first igniter 1332a. The resulting combustion drives the chordon 1340 to the left as the parallel links 1360 rotate in a clockwise direction about their respective pivot axes P. As the chordon 1340 moves from right to left, it drives exhaust gases out of the second combustion chamber 1303b past the open exhaust valve 1330b. By the time the chordon 1340 reaches the position of FIG. 13B, the second exhaust valve 1330b is fully open to maximize the exhaust flow out of the second combustion chamber 1303b.

As the chordon 1340 approaches the position shown in FIG. 13A, the first exhaust valve 1330a begins to open so that the exhaust gases can start flowing out of the first combustion chamber 1303a. At this time, the second exhaust valve 1330b in the second combustion chamber 1303b is fully, or nearfully, closed. When the chordon 1340 stops and reverses motion, continued movement from left to right drives exhaust gases out of the first combustion chamber 1303a past the open exhaust valve 1330a and draws a fresh intake charge into the second combustion chamber 1303b past an open intake valve (not shown).

When the chordon 1340 again reaches the position shown in FIG. 13C, the intake valve (not shown) in the second combustion chamber 1303b is now fully, or near-fully, closed. Continued movement of the chordon 1340 from right to left toward the position shown in FIG. 13A compresses the intake charge in the second combustion chamber 1303b while drawing a fresh intake charge into the first combustion chamber 1303a. When the chordon 1340 reaches the position shown in FIG. 13A, it will again be at the BDC position on the intake stroke for the first combustion chamber 1303a, and at the TDC position on the compression stroke for the second combustion chamber 1303b. Accordingly, at or about this time the second fuel injector 1334b injects fuel into the second combustion chamber 1303b and the igniter 1332b ignites the resulting fuel/air mixture. The resulting combustion drives the chordon 1340 to the right causing the four-stroke engine cycle described above to repeat.

Although a dual-barrel radial impulse engine is described above with reference to FIGS. 13A-13C for purposes of illustration, in other embodiments, other engines similar to the engine 1300 can include more chordons similar to the chordons 1340 and more swept surfaces similar to the swept surfaces 1346. For example, in one other embodiment, a radial impulse engine similar to the engine 1300 can include two half-barrel chordons that are coupled together and move back and forth across four corresponding swept surfaces. In further embodiments, other engines (or, alternatively, other pump systems) can include three or more chordons coupled together that sweep across six or more corresponding swept surfaces. Such configurations may be advantageous in a pump configuration in which it is desired to pump equal or proportional amounts of various fluids from separate chambers. As the foregoing makes clear, the inventive aspects disclosed in FIGS. 13A-13C are not limited to the particular embodiment illustrated.

Figure 14A:
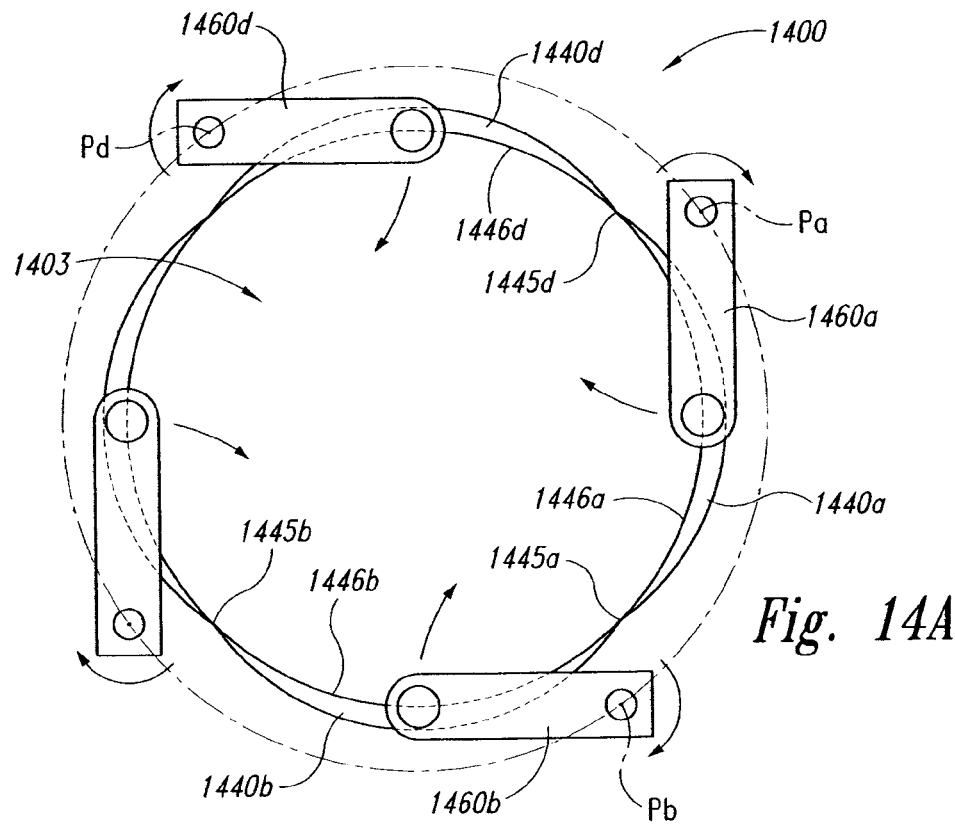
FIGS. 14A-14D are a series of schematic views of a radial impulse engine configured in accordance with yet another embodiment of the invention.
Figure 14B:
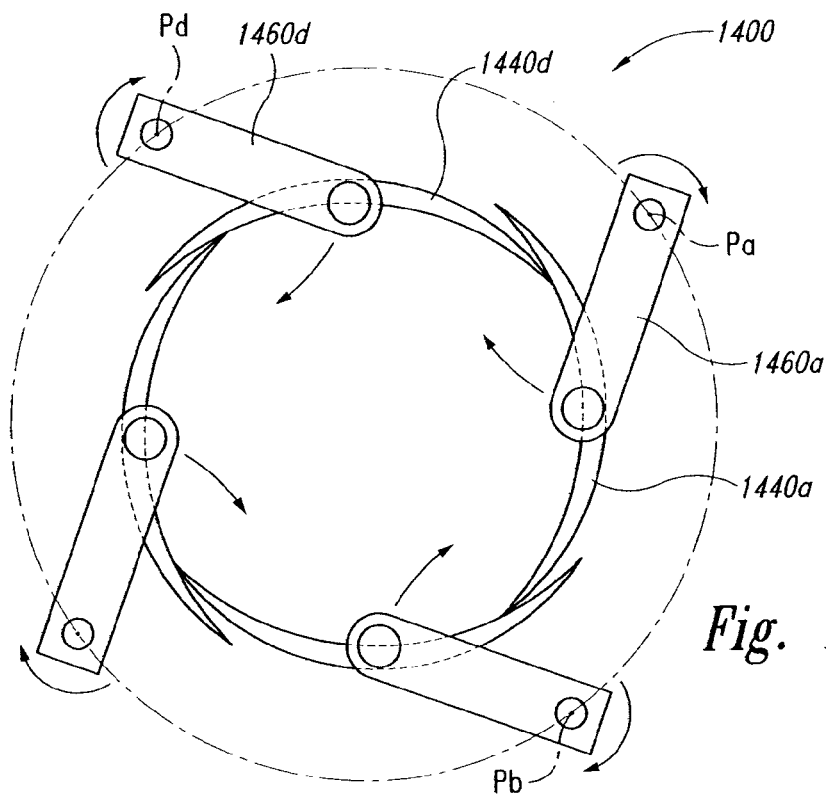
Figure 14C:
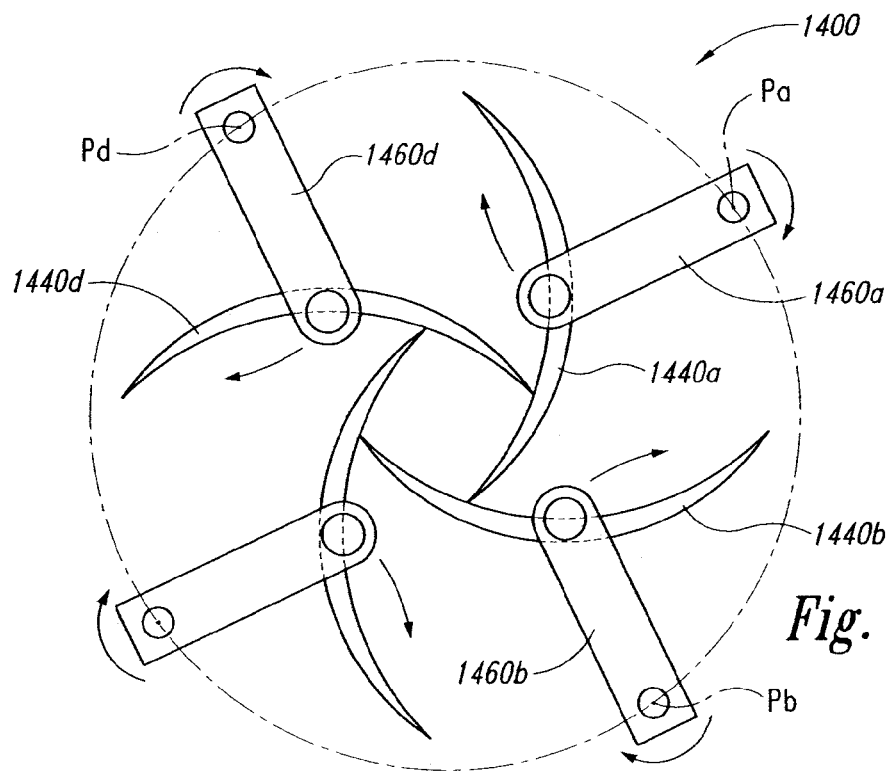
Figure 14D:
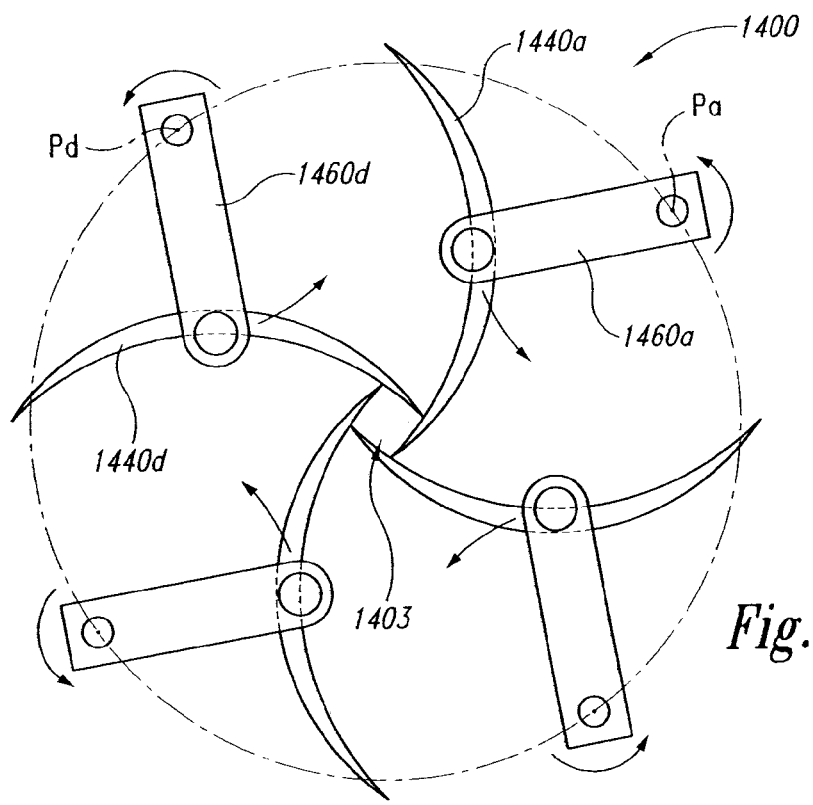
Figure 15A:
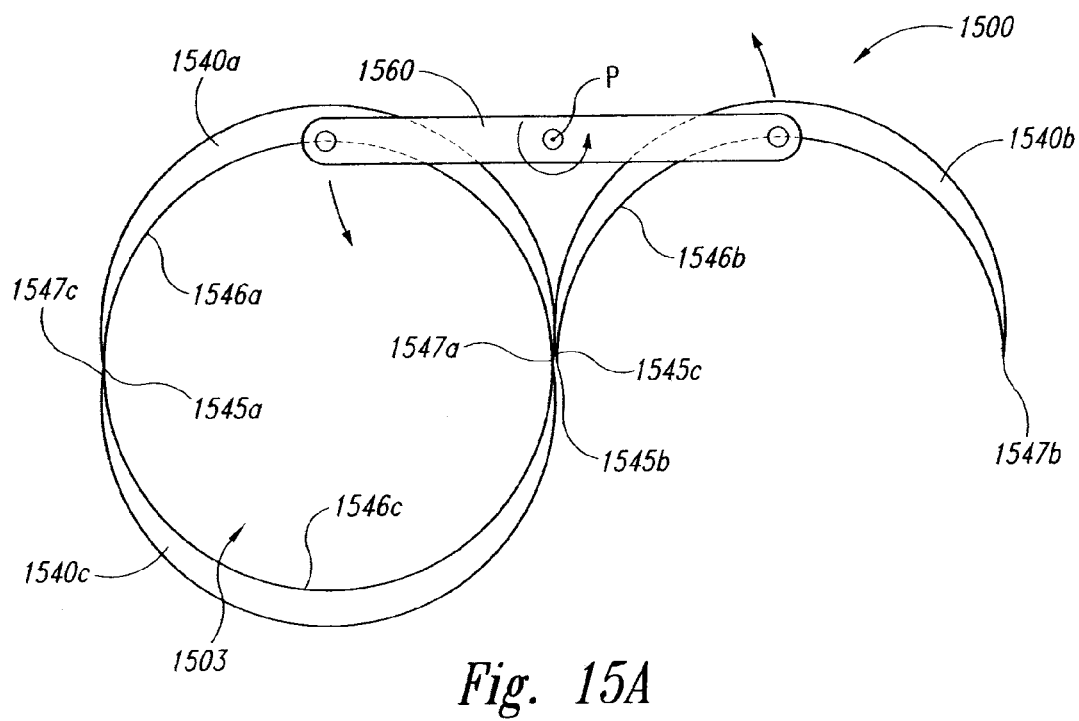
FIGS. 15A-15D are a series of schematic views of a chordon apparatus configured in accordance with a further embodiment of the invention.
Figure 15B:
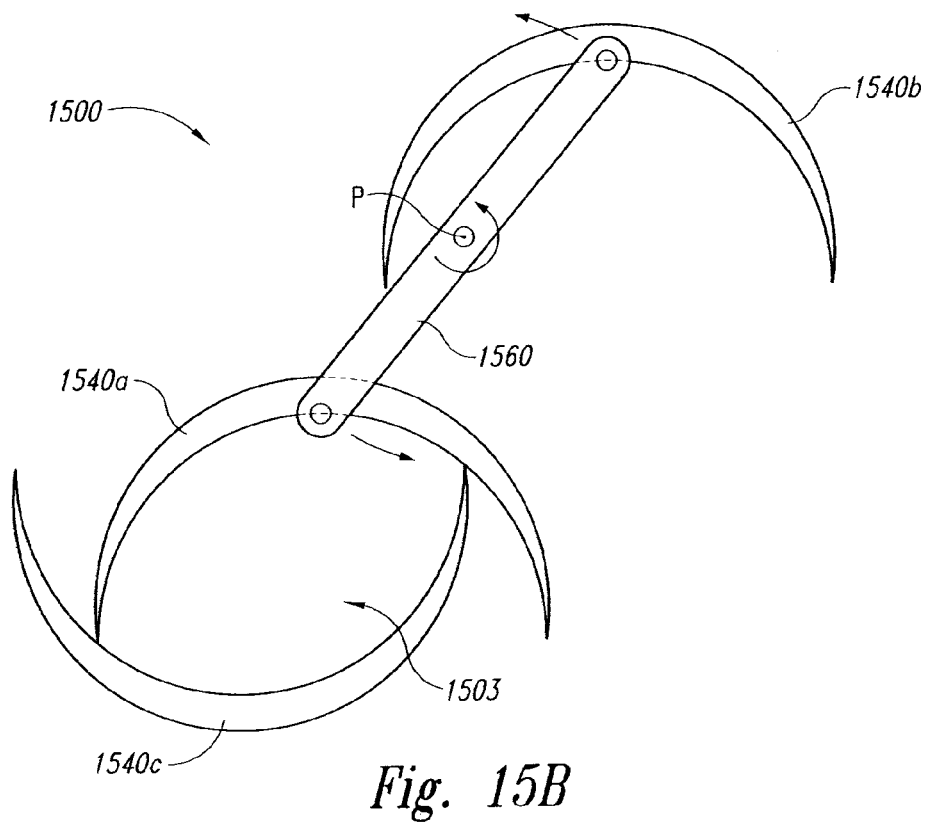
Figure 15C:
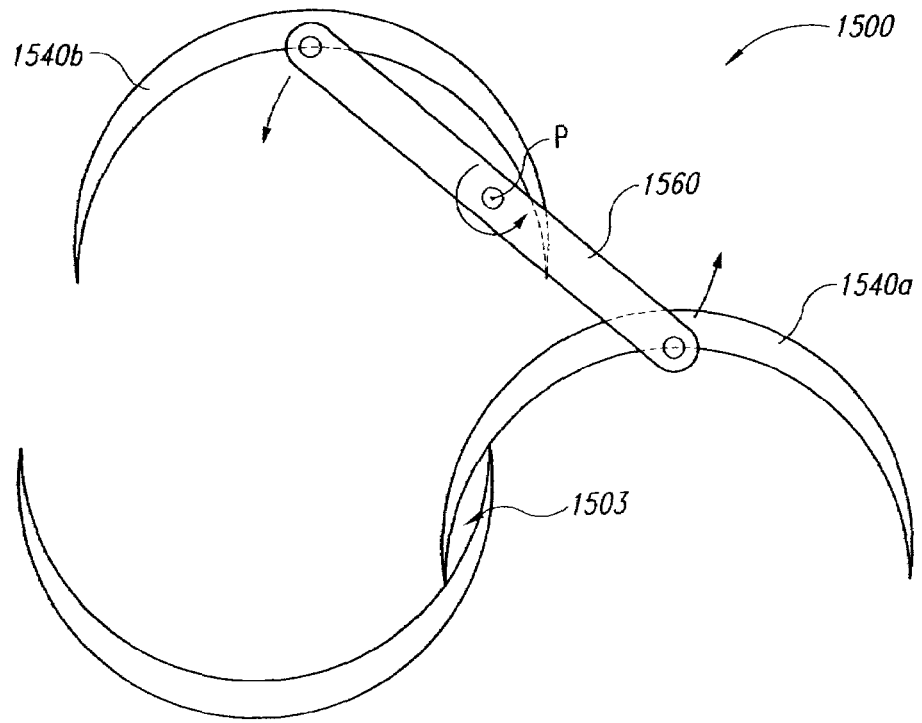
Figure 15D:
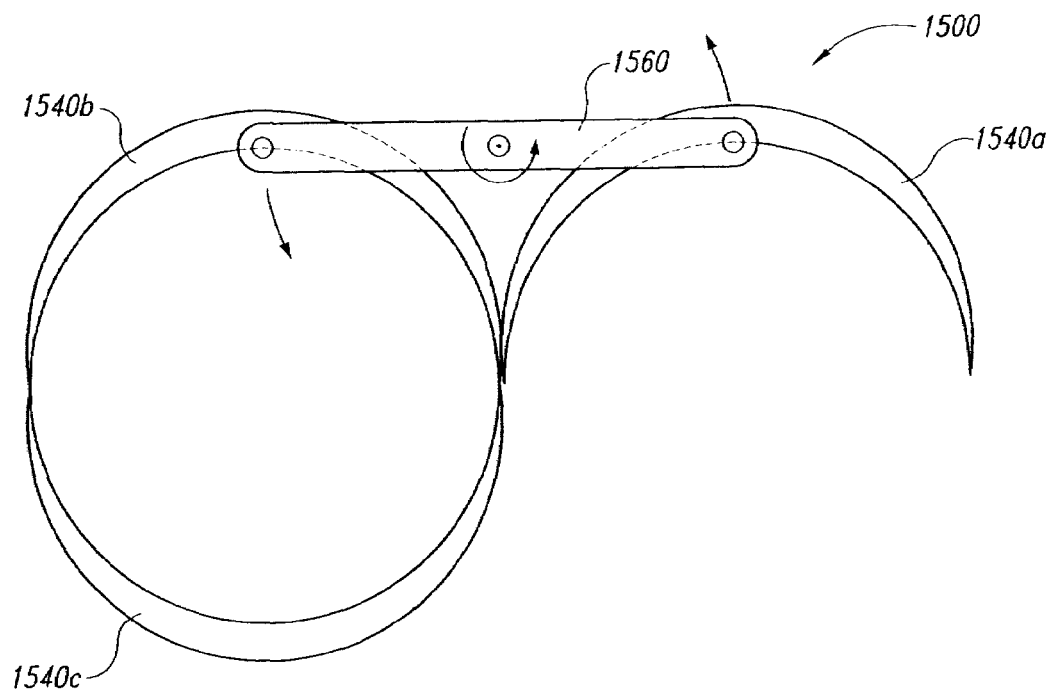

FIGS. 14A-14D are a series of schematic top views of a portion of a radial impulse engine 1400 ("engine 1400") configured in accordance with yet another embodiment of the invention. Referring first to FIG. 14A, the engine 1400 includes a plurality of movable members or chordons 1440 (identified individually as chordons 1440a-d) operably coupled to individual links 1460 (identified individually as links 1460a-d). Each of the chordons 1440 includes a swept surface 1446 (identified individually as swept surfaces 1446a-d) which forms a ninety-degree segment of a circular combustion chamber 1403. Each chordon 1440 additionally includes a distal edge portion 1445 (identified individually as distal edge portions 1445a-d) configured to slide across the swept surface 1446 of the adjacent chordon 1440 during engine operation.

Referring to FIGS. 14A-14D together, during engine operation the chordons 1440 translate inwardly and outwardly in unison as the links 1460 rotate back and forth about pivot axes P (identified individually as pivot axes Pa-d). As the figures illustrate, the chordons 1440 translate but do not rotate with respect to each other. Although not shown in the figures, the engine 1400 can further include a system of gears, links, and/or other devices to maintain chordon alignment during engine operation.

As FIGS. 14A-14D further illustrate, when the chordons 1440 translate inwardly on their arcuate paths, they compress the volume of the combustion chamber 1403. Similarly, after the chordons 1440 reach the TDC position shown in FIG. 14D, they reverse direction and translate outwardly, causing the combustion chamber 1403 to expand. Although the requisite intake, exhaust, ignition, power take-out, and/or other features necessary for engine function are not shown in FIGS. 14A-14D for purposes of clarity, those of ordinary skill in the art will understand that various combinations of such features as disclosed herein and in related U.S. Provisional Patent Application No. 60/676,017 can be included with the engine 1400 to perform these functions.

Although the engine 1400 described above includes four ninety-degree chordons 1440, in other embodiments, other engines configured in accordance with aspects of the present invention can include more or fewer chordons of similar design. For example, in another embodiment, a similar engine can include three chordons of 120 degrees each. In a further embodiment, another similar engine can include five chordons of 72 degrees each. Accordingly, the inventive aspects of the engine 1400 are not limited to the particular embodiment illustrated, but extend to other engines having more or fewer chordons that function in a similar manner.

FIGS. 15A-15D are a series of schematic top views of a portion of a chordon apparatus 1500 configured in accordance with a further embodiment of the invention. Referring the FIG. 15A, many features of the chordon apparatus 1500 are generally similar in structure and function to corresponding features of the engine 1300 described above with reference to FIGS. 13A-13C. In the illustrated embodiment, however, the chordon apparatus 1500 includes two movable chordons 1540a and 1540b, and a fixed chordon 1540c. Each of the chordons 1540 includes a swept surface 1546 (identified individually as swept surfaces 1546a-c) extending between a first distal edge portion 1545 (identified individually as first distal edge portions 1545a-c) and a second distal edge portion 1547 (identified individually as second distal edge portions 1547a-c). The movable chordons 1540a and 1540b are operably coupled to opposite ends of a link 1560 that rotates in a counterclockwise direction about a fixed pivot axis P.

Referring to FIGS. 15A-15D together, the first chordon 1540a and the second chordon 1540b take turns sweeping across the fixed chordon 1540c as the link 1560 rotates in a counterclockwise direction about the pivot axis P. This motion causes a chamber 1503 to contract from full volume when opposing distal edge portions 1545 and 1547 are aligned (see, e.g., FIG. 15A) to essentially zero volume as one of the movable chordons 1540a or 1540b moves away from the fixed chordon 1540c (see, e.g., FIG. 15C). Although not shown in the figures, the chordon apparatus 1500 can include a series of gears, linkages, and/or other devices to maintain alignment of the movable chordons 1540a and 1540b relative to the fixed chordon 1540c and each other during operation.

In one embodiment, the contracting chamber 1503 can be utilized as part of a pump or compressor system. In other embodiments, various aspects of the chordon apparatus 1500 can be utilized in internal combustion engines, steam engines, and other useful machines.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An engine comprising:
   a first end wall portion;
   a second end wall portion spaced apart from the first end wall portion to at least partially define a pressure chamber therebetween;
   a first movable member operably disposed between the first and second end wall portions, wherein the first movable member has a first distal edge portion and a first cylindrical surface; and
   a second movable member operably disposed between the first and second end wall portions, wherein the second movable member has a second distal edge portion and a second cylindrical surface, wherein the first distal edge portion of the first movable member is configured to slide across the second cylindrical surface of the second moveable member as the second distal edge portion of the second movable member slides across the first cylindrical surface of the first movable member, and as the first movable member pivots about a first pivot axis and the second movable member pivots about a second pivot axis.

2. The engine of claim 1, wherein the first and second pivot axes extend through the first and second end wall portions.

3. The engine of claim 1 wherein the first movable member is at least substantially identical to the second movable member.

4. The engine of claim 1, wherein the first movable member includes a first wall portion and a second wall portion, wherein the first wall portion includes the first cylindrical surface and the second wall portion includes the first distal edge portion.

5. The engine of claim 1 wherein the first and second cylindrical surfaces are convex cylindrical surfaces.

6. The engine of claim 1 further comprising at least one crankshaft operably coupled to at least the first movable member.

7. The engine of claim 1, further comprising means for synchronizing movement of the first and second movable members.

8. The engine of claim 1, further comprising means for converting pivotal motion of at least the first movable member into rotational motion of an associated crankshaft.

9. An internal combustion engine comprising:
   a combustion chamber;
   a first movable member positioned proximate to the combustion chamber, wherein the first movable member has a first distal edge portion and a first cylindrical surface;
   a second movable member positioned proximate to the combustion chamber, wherein the second movable member has a second distal edge portion and a second cylindrical surface;
   means for introducing fuel into the combustion chamber; and
   means for igniting the fuel in the combustion chamber, thereby causing the first distal edge portion of the first movable member to slide across the second cylindrical surface of the second moveable member as the second distal edge portion of the second movable member slides across the first cylindrical surface of the first movable member, and as the first movable member pivots about a first pivot axis and the second movable member pivots about a second pivot axis.

10. The internal combustion engine of claim 9, further comprising means for synchronizing movement of the first and second movable members.

11. The internal combustion engine of claim 9 wherein the combustion chamber is positioned between the first and second movable members.

12. An energy conversion device comprising:
    a first end wall portion;
    a second end wall portion spaced apart from the first end wall portion;
    a first movable member operably disposed between the first and second end wall portions, wherein the first movable member has a first distal edge portion and a first curved surface; and
    a second movable member operably disposed between the first and second end wall portions and spaced apart from the first movable member to at least partially define a pressure chamber therebetween, wherein the second movable member has a second distal edge portion and a second curved surface, wherein the first distal edge portion of the first movable member is configured to slide across the second curved surface of the second moveable member, and the second distal edge portion of the second movable member is configured to slide across the first curved surface of the first movable member, as the first movable member pivots back and forth about a first pivot axis and the second movable member pivots back and forth about a second pivot axis.

13. The energy conversion device of claim 12 wherein the first and second pivot axes are fixed relative to the first and second end wall portions.

14. The energy conversion device of claim 12 wherein the first movable member includes a first wall portion having the first distal edge portion and a second wall portion having the first curved surface, and wherein the second movable member includes a third wall portion having the second distal edge portion and a fourth wall portion having the second curved surface.

15. An energy conversion device comprising:

a first end wall portion;

a second end wall portion spaced apart from the first end wall portion;

a first movable member operably disposed between the first and second end wall portions, wherein the first movable member includes a first wall portion having a first distal edge portion and a second wall portion having a first curved surface, wherein a first pivot axis is positioned between the first and second wall portions; and a second movable member operably disposed between the first and second end wall portions and spaced apart from the first movable member to at least partially define a pressure chamber therebetween, wherein the second movable member includes a third wall portion having a second distal edge portion and a fourth wall portion having a second curved surface, wherein a second pivot axis is positioned between the third and fourth wall portions, and wherein the first distal edge portion of the first movable member is configured to slide across the second curved surface of the second moveable member, and the second distal edge portion of the second movable member is configured to slide across the first curved surface of the first movable member, as the first movable member pivots about the first pivot axis and the second mnovable member pivots about the second pivot axis.

16. The energy conversion device of claim 15 wherein the first and second wall portions of the first movable member form a "V" shape.

17. The energy conversion device of claim 12 wherein the first pivot axis is spaced apart from the second pivot axis by a distance D, and wherein the first curved surface has a radius of curvature R which is at least approximately equal to D.

18. The energy conversion device of claim 12 wherein the first end wall portion includes at least one aperture for admitting fluid into the pressure chamber.

19. The energy conversion device of claim 12 wherein the first end wall portion includes at least one aperture for admitting a fuel/air mixture into the pressure chamber.

20. The energy conversion device of claim 12, further comprising at least one crankshaft operably coupled to at least the first movable member.

* * * * *